(12) United States Patent
Ogawa

(10) Patent No.: US 10,266,065 B2
(45) Date of Patent: Apr. 23, 2019

(54) ELECTRIC VEHICLE AND CONTROL METHOD FOR ELECTRIC VEHICLE

(71) Applicant: TOYOTA JIDOSHA KABUSHIKI KAISHA, Toyota-shi, Aichi-ken (JP)

(72) Inventor: Yuki Ogawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 51 days.

(21) Appl. No.: 15/691,812

(22) Filed: Aug. 31, 2017

(65) Prior Publication Data

US 2018/0065499 A1 Mar. 8, 2018

(30) Foreign Application Priority Data

Sep. 5, 2016 (JP) .................................. 2016-172835

(51) Int. Cl.
*B60L 11/18* (2006.01)
*B60L 7/10* (2006.01)
(Continued)

(52) U.S. Cl.
CPC ............. *B60L 11/1862* (2013.01); *B60L 7/10* (2013.01); *B60L 7/14* (2013.01); *B60L 15/2045* (2013.01); *B60L 2240/12* (2013.01); *B60L 2240/42* (2013.01); *B60L 2240/423* (2013.01); *B60L 2240/622* (2013.01); *B60L 2240/642* (2013.01); *B60L 2240/68* (2013.01); *B60L 2250/16* (2013.01); *B60W 10/06* (2013.01); *B60W 10/08* (2013.01); *B60W 20/12* (2016.01); *B60W 20/13* (2016.01); *B60W 50/14* (2013.01); *B60W 2050/146* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7283* (2013.01);
(Continued)

(58) Field of Classification Search
CPC ........... B60L 11/1862; B60L 7/10; B60L 7/14
USPC .......................................................... 701/22
See application file for complete search history.

(56) References Cited

U.S. PATENT DOCUMENTS

2009/0160247 A1* 6/2009 Nakamura ............. B60K 6/365
307/9.1
2012/0283902 A1* 11/2012 Kusumi ................... B60K 6/46
701/22
(Continued)

FOREIGN PATENT DOCUMENTS

JP 2000-134719 5/2000
JP 2004-101245 4/2004
(Continued)

*Primary Examiner* — Yazan A Soofi
(74) *Attorney, Agent, or Firm* — Finnegan, Henderson, Farabow, Garrett & Dunner, LLP

(57) ABSTRACT

An HV-ECU specifies a control target section satisfying a predetermined condition in a scheduled traveling route and performs SOC control of changing an SOC of a power storage device in advance before entering the control target section. An HMI device displays that the SOC control is being performed. The HV-ECU controls the HMI device such that that the SOC control is being performed is not displayed until a distance to a start point of the control target section is less than a predetermined distance after the SOC control is started and that the SOC control is being performed is displayed when the distance is less than the predetermined distance.

6 Claims, 21 Drawing Sheets

(51) Int. Cl.
*B60L 7/14* (2006.01)
*B60L 15/20* (2006.01)
*B60W 20/12* (2016.01)
*B60W 20/13* (2016.01)
*B60W 10/06* (2006.01)
*B60W 10/08* (2006.01)
*B60W 50/14* (2012.01)

(52) U.S. Cl.
CPC ............ *Y02T 10/7291* (2013.01); *Y02T 90/16* (2013.01); *Y02T 90/162* (2013.01); *Y10S 903/93* (2013.01); *Y10S 903/947* (2013.01)

(56) References Cited

U.S. PATENT DOCUMENTS

| | | | | |
|---|---|---|---|---|
| 2015/0019057 | A1* | 1/2015 | Morisaki | B60L 7/18 701/22 |
| 2016/0001667 | A1* | 1/2016 | Masuda | B60L 11/14 320/109 |
| 2016/0185250 | A1* | 6/2016 | Izumi | B60L 11/1874 701/22 |
| 2016/0264124 | A1* | 9/2016 | Hotta | B60K 6/445 |
| 2017/0021820 | A1* | 1/2017 | Ogawa | B60L 11/1861 |
| 2018/0065499 | A1* | 3/2018 | Ogawa | B60L 7/14 |

FOREIGN PATENT DOCUMENTS

| | | |
|---|---|---|
| JP | 2004-147460 | 5/2004 |
| JP | 2008-100646 | 5/2008 |
| JP | 2010-269712 | 12/2010 |
| JP | 2013-177089 | 9/2013 |
| JP | 2014-15125 | 1/2014 |
| JP | 2015-19521 | 1/2015 |

\* cited by examiner

ELECTRIC VEHICLE AND CONTROL METHOD FOR ELECTRIC VEHICLE

INCORPORATION BY REFERENCE

The disclosure of Japanese Patent Application No. 2016-172835 filed on Sep. 5, 2016 including the specification, drawings and abstract is incorporated herein by reference in its entirety.

BACKGROUND OF THE INVENTION

1. Field of the Invention

The invention relates to an electric vehicle including a motor generator for traveling and a control method for the electric vehicle.

2. Description of Related Art

As an electric vehicle including a motor generator for traveling, a vehicle that specifies a control target section satisfying predetermined conditions in a scheduled traveling route and changes a state of charge (hereinafter also referred to as "SOC") of a power storage device before entering the control target section is known. For example, Japanese Patent Application Publication No. 2000-134719 (JP 2000-134719 A), Japanese Patent Application Publication No. 2014-15125 (JP 2014-15125 A), and Japanese Patent Application Publication No. 2010-269712 (JP 2010-269712 A) disclose that a large decrease in SOC is prevented during traveling in a congested section by increasing the SOC of the power storage device in advance before entering the congested section when it is predicted that the congested section (the control target section) is included in a scheduled traveling route (see JP 2000-134719 A, JP 2014-15125 A, and JP 2010-269712 A).

SUMMARY OF THE INVENTION

The control of changing an SOC of a power storage device in advance before entering a control target section in a scheduled traveling route is started, for example, several km to the control target section prior. Accordingly, the control may be performed at a time at which the control target section (for example, a congested section) is not yet displayed on a display screen of a navigation device and a driver is not aware of the control target section. When a display device displays that the control is being executed in this state, there is a likelihood that the driver will feel discomfort.

The invention is for reducing a driver's discomfort due to display of control of changing an SOC of a power storage device in advance before entering a control target section in a scheduled traveling route in an electric vehicle that can perform such control.

An electric vehicle according to the invention includes a power storage device, a motor generator, an electronic control unit, and a display device. The motor generator is configured to generate a driving force for traveling using electric power stored in the power storage device and to generate regenerative power. The electronic control unit is configured to specify a control target section satisfying a predetermined condition in a scheduled traveling route, and to perform SOC control of changing an SOC of the power storage device in advance before entering the control target section. The display device is configured to display that the SOC control is being performed. The electronic control unit is configured to control the display device such that that the SOC control is being performed is not displayed until a distance to a start point of the control target section is less than a predetermined distance (Ddsp) after the SOC control is started, and to control the display device such that that the SOC control is being performed is displayed when the distance to the start point of the control target section is less than the predetermined distance. The electric vehicle according to the invention may be defined as follows. An electric vehicle includes: a power storage device; a motor generator configured to generate a driving force for traveling using electric power stored in the power storage device and the motor generator being configured to generate regenerative power; an electronic control unit configured to specify a control target section satisfying a predetermined condition in a scheduled traveling route, and to perform a charging state control to change a state of charge of the power storage device in advance before the electric vehicle enters the control target section; and a display device configured to display that the charging state control is being performed, the electronic control unit being configured to control the display device such that information that the charging state control is being performed is not displayed until a distance from the electric vehicle to a start point of the control target section is less than a predetermined distance after the charging state control is started, and to control the display device such that the information that the charging state control is being performed is displayed when the distance is less than the predetermined distance.

In the electric vehicle, since the SOC control of changing the SOC of the power storage device in advance is performed before entering the control target section and that the SOC control is being performed is displayed on the display device, a driver can be aware that the SOC of the power storage device has changed due to the SOC control being performed. In the electric vehicle, that the SOC control is being performed is not displayed on the display device until the distance to the start point of the control target section is less than the predetermined distance after the SOC control is started. Accordingly, it is not possible to display that the SOC control is being performed in a state in which a driver cannot be aware of a control target section because the control target section is present very remote from now on, and it is possible to start display of the SOC control on the display device after the distance to a start point of the control target section is less than the predetermined distance and thus the driver can be aware of the control target section. Accordingly, according to this electric vehicle, it is possible to decrease a driver's discomfort due to display of the SOC control in execution.

The electronic control unit may be configured to specify a congested section satisfying the predetermined conditions in the scheduled traveling route as the control target section using congestion information which is updated at predetermined time intervals and to start the SOC control (congestion SOC control) such that the SOC of the power storage device is increased before entering the congested section. The electronic control unit may be configured to control the display device such that that the congestion SOC control is being performed is not displayed until a distance to a start point of the congested section is less than the predetermined distance after the congestion SOC control is started.

Since the congestion information is updated at the predetermined time intervals, the start time of the congestion SOC control may vary due to delayed specification of the congested section. In the electric vehicle, even when the start time of the congestion SOC control varies, the display device does not display that the congestion SOC control is being performed until the distance to the start point of the congested section is less than the predetermined distance, and the display device displays that the congestion SOC control is being performed when the distance to the start point of the congested section is less than the predetermined distance. Accordingly, according to the electric vehicle, even when the start time of the congestion SOC control varies, it is possible to minimize variation of a display start time of the display device and to decrease a driver's discomfort.

The electronic control unit may be configured to specify a downhill section satisfying the predetermined condition in the scheduled traveling route as the control target section using map information including information on road gradients and to start the SOC control (downhill SOC control) such that the SOC of the power storage device is decreased before entering the downhill section. The electronic control unit may be configured to control the display device such that that the downhill SOC control is being performed is not displayed until a distance to a start point of the downhill section is less than the predetermined distance after the downhill SOC control is started.

The electronic control unit may be configured to specify an uphill section satisfying the predetermined condition in the scheduled traveling route as the control target section using map information including information on road gradients and to start the SOC control (uphill SOC control) such that the SOC of the power storage device is increased before the electric vehicle enters the uphill section. The electronic control unit may be configured to control the display device such that that the uphill SOC control is being performed is not displayed until a distance to a start point of the uphill section is less than the predetermined distance after the uphill SOC control is started.

In the electric vehicle, it is not possible to display that the downhill SOC control (the uphill SOC control) is performed in a state in which a driver cannot be aware of a downhill section (an uphill section) because the downhill section (the uphill section) is present very remote from now on, and it is possible to start display of the SOC control on the display device after the distance to a start point of the downhill section (the uphill section) is less than the predetermined distance and thus the driver can be aware of the downhill section (the uphill section). Accordingly, according to this electric vehicle, it is possible to decrease a driver's discomfort due to display of the downhill SOC control (the uphill SOC control) in execution.

The electronic control unit may be configured to control the display device such that that the SOC control is being performed is not displayed until a predetermined period elapses after the SOC control ends even when display of next SOC control on the display device is required at an end time of the SOC control. The electronic control unit may be configured to control the display device such that the display is started after the predetermined period elapses.

When display of next SOC control is immediately started at the end time of the SOC control, there is a likelihood that a driver will feel discomfort because the display is maintained even if the electric vehicle has passed through the control target section (the congested section or the downhill/uphill section). In the electric vehicle, since that the SOC control is being performed is not displayed until the predetermined period elapses after the SOC control ends, a driver can be aware that the first SOC control has ended normally. Accordingly, according to the electric vehicle, it is possible to decrease a driver's discomfort when sequential SOC control is performed.

According to the invention, there is provided a control method for an electric vehicle, the electric vehicle including a power storage device, a motor generator, and a display device. The motor generator is configured to generate a driving force for traveling using electric power stored in the power storage device and to generate regenerative power. The control method includes a step of specifying a control target section satisfying a predetermined condition in a scheduled traveling route and a step of performing SOC control of changing an SOC of the power storage device in advance before entering the control target section. The display device is configured to display that the SOC control is being performed. The control method further includes a step of controlling the display device such that that the SOC control is being performed is not displayed until a distance to a start point of the control target section is less than a predetermined distance after the SOC control is started, and that the SOC control is being performed is displayed when the distance to the start point of the control target section is less than the predetermined distance. The control method according to the invention may be defined as follows. A control method for an electric vehicle, the electric vehicle including a power storage device, a motor generator configured to generate a driving force for traveling using electric power stored in the power storage device and the motor generator being configured to generate regenerative power, a display device configured to display information regarding a charging state control of the power storage device, and an electronic control unit, the control method including: specifying a control target section satisfying a predetermined condition in a scheduled traveling route by the electronic control unit; performing the charging state control to change a state of charge of the power storage device in advance before the electric vehicle enters the control target section by the electronic control unit; controlling the display device by the electronic control unit such that information that the charging state control is being performed is not displayed until a distance from the electric vehicle to a start point of the control target section is less than a predetermined distance after the charging state control is started; and controlling the display device by the electronic control unit such that the information that the charging state control is being performed is displayed when the distance is less than the predetermined distance.

According to the control method, it is not possible to display that the SOC control is being performed in a state in which a driver cannot be aware of a control target section because the control target section is present very remote from now on, and it is possible to start display of the SOC control on the display device after the distance to a start point of the control target section is less than the predetermined distance and thus the driver can be aware of the control target section. Accordingly, according to this control method, it is possible to decrease a driver's discomfort due to display of the SOC control in execution.

According to the invention, it is possible to decrease a driver's discomfort due to display of SOC control of changing an SOC of a power storage device in advance before entering a control target section in a scheduled traveling route in an electric vehicle that can perform such SOC control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
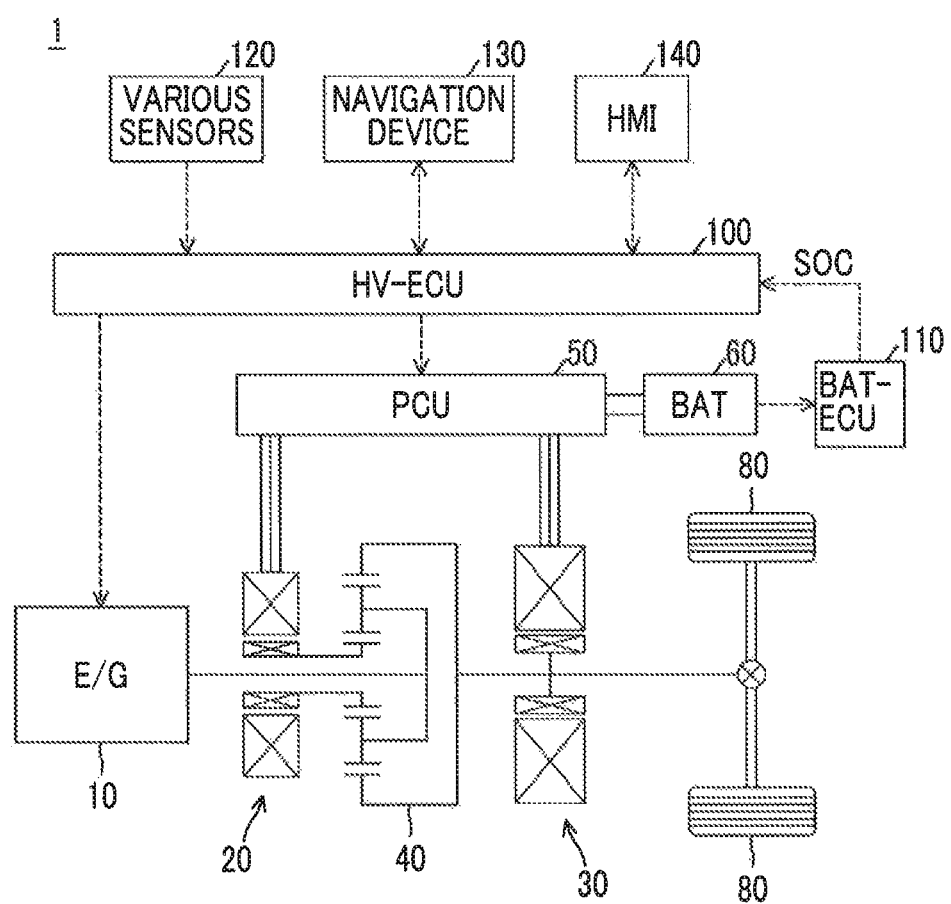
FIG. 1 is a diagram illustrating an overall configuration of a vehicle according to a first embodiment.

Hereinafter, embodiments of the invention will be described in detail with reference to the accompanying drawings. The same or corresponding elements in the drawings will be referenced by the same reference signs and description thereof will not be repeated.

First Embodiment

FIG. 1 is a diagram illustrating an overall configuration of a vehicle 1 according to a first embodiment. Referring to FIG. 1, the vehicle 1 includes an engine 10, a first motor generator (hereinafter referred to as a "first MG") 20, a second motor generator (hereinafter referred to as a "second MG") 30, a power split device 40, a power control unit (PCU) 50, a power storage device 60, and driving wheels 80.

The vehicle 1 is a hybrid vehicle which is driven using at least one of power from the engine 10 and power from the second MG 30. In the invention, it is assumed that the vehicle 1 is a hybrid vehicle, but a vehicle to which the invention can be applied is not limited to a hybrid vehicle as long as it is an electric vehicle including a motor generator for traveling.

The engine 10 is an internal combustion engine that outputs power by converting combustion energy, which is generated when an air-fuel mixture is combusted, into the kinetic energy of a mobile member such as a piston or a rotor. The power split device 40 includes, for example, a planetary gear mechanism including three rotary shafts such as a sun gear, a carrier, and a ring gear. The power split device 40 splits power output from the engine 10 into power for driving the first MG 20 and power for driving the driving wheels 80.

The first MG 20 and the second MG 30 are AC electric motors and are, for example, three-phase AC synchronous electric motors in which a permanent magnet is embedded in a rotor. The first MG 20 is used mainly as a power generator that is driven by the engine 10 via the power split device 40. Electric power generated by the first MG 20 is supplied to the second MG 30 or the power storage device 60 via the PCU 50.

The second MG 30 serves mainly as an electric motor and drives the driving wheels 80. The second MG 30 is driven in response to at least one of electric power from the power storage device 60 and electric power generated by the first MG 20, and a driving force of the second MG 30 is transmitted to the driving wheels 80. On the other hand, at the time of braking of the vehicle 1 or decelerating of the vehicle 1 on a downhill road, the second MG 30 serves as a power generator to generate regenerative power. The electric power generated by the second MG 30 is recovered to the power storage device 60 via the PCU 50.

The PCU 50 converts DC power supplied from the power storage device 60 into AC power for driving the first MG 20 and the second MG 30. The PCU 50 converts AC power generated by the first MG 20 and the second MG 30 into DC power for charging the power storage device 60. The PCU 50 includes two inverters that are disposed to correspond to the first MG 20 and the second MG 30 and a converter that steps up a DC voltage supplied to each inverter to a voltage of the power storage device 60 or higher.

The power storage device 60 is a DC power source that is rechargeable and includes, for example, a secondary battery such as a lithium-ion battery or a nickel-hydride battery. The power storage device 60 is charged with electric power generated by at least one of the first MG 20 and the second MG 30. The power storage device 60 supplies the stored electric power to the PCU 50. An electric double-layer capacitor or the like may be employed as the power storage device 60.

The power storage device 60 is provided with a voltage sensor, a current sensor, and a temperature sensor that detect a voltage, an input/output current, and a temperature of the power storage device 60, and values detected by the sensors are output to a BAT-ECU 110.

The vehicle 1 includes an HV-electronic control unit (ECU) 100, a BAT-ECU 110, various sensors 120, a navigation device 130, and a human machine interface (HMI) device 140.

Figure 2:
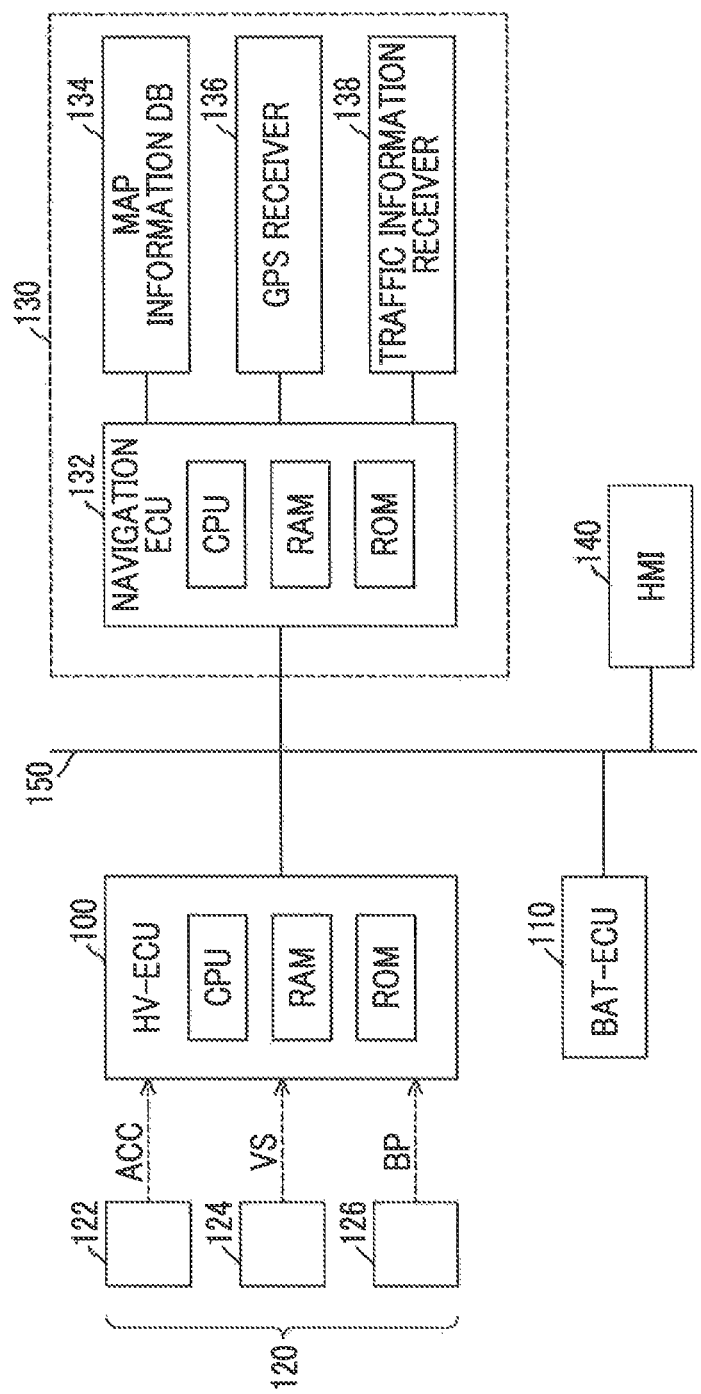
FIG. 2 is a block diagram illustrating a detailed configuration of an HV-ECU, various sensors, and a navigation device.

FIG. 2 is a block diagram illustrating a detailed configuration of the HV-ECU 100, various sensors 120, and the navigation device 130. Referring to FIG. 2 along with FIG. 1, the HV-ECU 100, the BAT-ECU 110, the navigation device 130, and the HMI device 140 are configured to communicate with each other via a controller area network (CAN) 150.

Various sensors 120 include an accelerator pedal sensor 122, a vehicle speed sensor 124, and a brake pedal sensor 126. The accelerator pedal sensor 122 detects an amount of depression of an accelerator pedal (hereinafter also referred to as an "accelerator depression amount") by a user. The vehicle speed sensor 124 detects a vehicle speed VS of the vehicle 1. The brake pedal sensor 126 detects an amount of depression of a brake pedal BP by a user. The sensors output the detection results to the HV-ECU 100.

The HV ECU 100 includes a read only memory (ROM) that stores process programs or the like, a random access memory (RAM) that temporarily stores data, and input and output ports (not illustrated) that input and output various signals, and performs a predetermined arithmetic operation based on information stored in a memory (the ROM and the RAM) or information from various sensors 120. The HV-ECU 100 controls the engine 10, the PCU 50, the navigation device 130, and the HMI device 140 based on the arithmetic operation results.

The HV-ECU 100 specifies a control target section (a congested section or an uphill/downhill section) satisfying a predetermined condition in a scheduled traveling route of the vehicle 1 in cooperation with the navigation device 130, and performs "SOC control" of changing an SOC of the power storage device 60 in advance depending on the control target section before entering the specified control target section.

Hereinafter, a control target section is simply also referred to as a "control target." The SOC control is referred to as "congestion SOC control" when the control target is a congested section, the SOC control is referred to as "downhill SOC control" when the control target is a downhill section, and the SOC control is referred to as "uphill SOC control" when the control target is an uphill section. The congestion SOC control, the downhill SOC control, and the uphill SOC control may also be simply referred to as "SOC control." A variety of controls including the SOC controls which are performed by the HV-ECU 100 will be described later in detail.

The BAT-ECU 110 includes a CPU, a ROM, a RAM, and input and output ports (all of which are not illustrated), and calculates an SOC of the power storage device 60 based on detected values of input and output currents and/or voltages of the power storage device 60. The SOC is obtained, for example, by converting a ratio of a current state of charge to a full capacity of the power storage device 60 into a percentage. The BAT-ECU 110 outputs the calculated SOC value to the HV-ECU 100. The HV-ECU 100 may calculate the SOC.

The navigation device 130 includes a navigation ECU 132, a map information database (DB) 134, a global positioning system (GPS) receiver 136, and a traffic information receiver 138.

The map information DB 134 is constituted by a hard disk drive (HDD) or the like and stores map information. Map information includes data on "nodes" indicating intersections or the like, "links" connecting the nodes, and "facilities" (such as buildings or parking lots) at edges of the links. Position information of each node is added to the corresponding node, and gradient information (an average gradient value or elevations at both ends of a link) or distance information of a road section corresponding to each link is added to the corresponding link.

The GPS receiver 136 acquires a current location of the vehicle 1 based on signals (radio waves) from GPS satellites (not illustrated) and outputs a signal indicating the location to the navigation ECU 132.

The traffic information receiver 138 receives road traffic information (for example, VICS (registered trademark) information) which is provided by FM multiplex broadcasting or the like. The road traffic information includes at least congestion information and may further include traffic regulation information, speed limit information, and parking lot information. The road traffic information is updated, for example, every five minutes.

The navigation ECU 132 includes a CPU, a ROM, a RAM, and input and output ports (not illustrated), and outputs a current location of the vehicle 1 and map information and congestion information for the surroundings of the current location to the HMI device 140 and the HV-ECU 100 based on a variety of information or signals received from the map information DB 134, the GPS receiver 136 and the traffic information receiver 138.

When a destination of the vehicle 1 is input through the HMI device 140 by a user, the navigation ECU 132 retrieves a route from the current location to the destination (a scheduled traveling route) of the vehicle 1 based on the map information DB 134. The scheduled traveling route includes a set of nodes and links from the current location to the destination of the vehicle 1. The navigation ECU 132 outputs the retrieval result (a set of nodes and links) of a route from the current location to the destination of the vehicle 1 to the HMI device 140. The navigation ECU 132 outputs route information within a predetermined range (for example, 10 km) from the current location in the retrieval result of the scheduled traveling route to the HV-ECU 100 in response to a request from the HV-ECU 100. The route information is used for SOC control in the HV-ECU 100 (which will be described later).

The HMI device 140 is a device that provides an occupant (for example, a driver) with information for supporting driving of the vehicle 1. The HMI device 140 is typically a display (a visual information display) disposed in a vehicle interior of the vehicle 1 and also includes a speaker (an auditory information output device). The HMI device 140 provides a user with a variety of information by outputting visual information (such as figure information or character information) or auditory information (such as voice information or sound information).

The HMI device 140 serves as a display of the navigation device 130. That is, the HMI device 140 receives the current location of the vehicle 1 and the map information and congestion information for the surroundings of the current location from the navigation device 130 via the CAN 150, and displays the current location of the vehicle 1 along with the map information and congestion information for the surroundings of the current location.

The HMI device 140 also serves as a touch panel which can be operated by a user, and a user can change a scale of a map which is displayed or can input a destination of the vehicle 1 by touching the touch panel. When a destination is input through the HMI device 140, position information of the destination is transmitted to the navigation device 130 via the CAN 150.

As described above, the navigation ECU 132 outputs information (hereinafter referred to as "scheduled traveling route information") within a predetermined range (for example, 10 km) from a current location in a scheduled traveling route to the HV-ECU 100 in response to a request from the HV-ECU 100 (for example, every minute). When the scheduled traveling route information is acquired from the navigation ECU 132, the HV-ECU 100 retrieves a control target (a congested section, a downhill section, or an uphill section) on which SOC control should be performed based on the scheduled traveling route information. When there is a control target on which SOC control should be performed, the HV-ECU 100 performs SOC control (congestion SOC control, downhill SOC control, or uphill SOC control) corresponding to the retrieved control target. This will be described in detail later for each control target.

Before describing SOC control in detail, driving control of the vehicle 1 which is performed by the HV-ECU 100 will be first described below.

<Driving Control>

Figure 3:
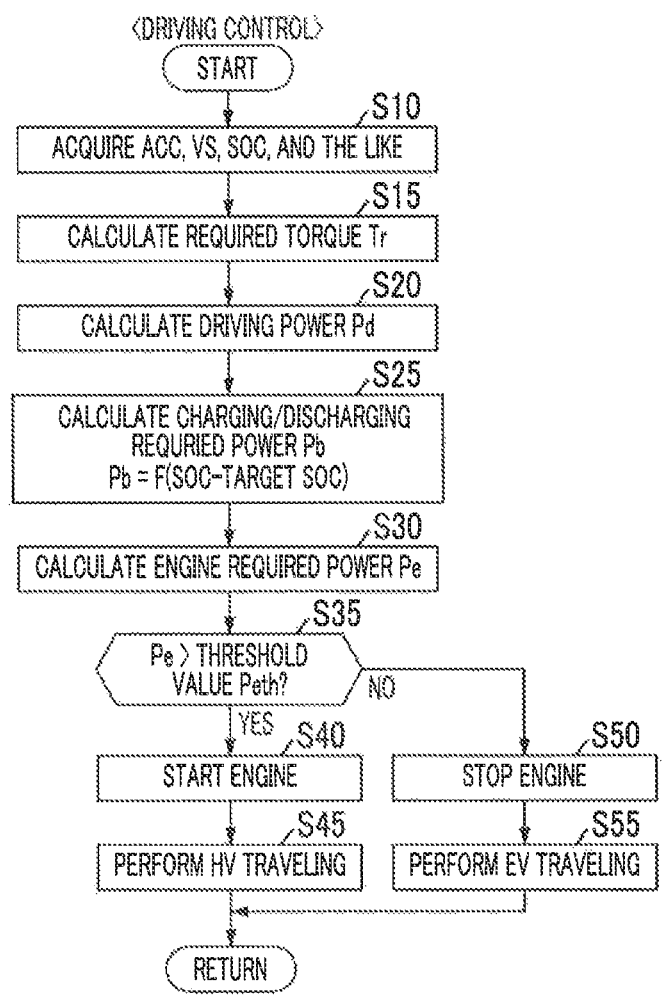
FIG. 3 is a flowchart illustrating a process flow of driving control which is performed by the HV-ECU.

FIG. 3 is a flowchart illustrating a process flow of driving control which is performed by the HV-ECU 100. A series of processes which is illustrated in the flowchart is repeatedly performed at predetermined time intervals, for example, when a system switch or the like of the vehicle 1 is turned on.

Referring to FIG. 3, the HV-ECU 100 acquires detected values of an accelerator depression amount ACC and a vehicle speed VS from the accelerator pedal sensor 122 and the vehicle speed sensor 124, and acquires a calculated value of an SOC of the power storage device 60 from the BAT-ECU 110 (Step S10).

Subsequently, the HV-ECU 100 calculates a required torque Tr for the vehicle 1 based on the acquired detected values of the accelerator depression amount ACC and the vehicle speed VS (Step S15). For example, a map representing a relationship between the accelerator depression amount ACC and the vehicle speed VS and the required torque Tr may be prepared in advance in the ROM of the HV-ECU 100 and the required torque Tr corresponding to the detected values of the accelerator depression amount ACC and the vehicle speed VS may be calculated using the map. Then, the HV-ECU 100 calculates a driving power Pd (a required value) of the vehicle 1 by multiplying the calculated required torque Tr by the vehicle speed VS (Step S20).

Subsequently, the HV-ECU 100 calculates a charging/discharging required power Pb for the power storage device 60 (Step S25). The charging/discharging required power Pb is calculated based on a difference ΔSOC between the SOC (an actual value) of the power storage device 60 and a target thereof. When the charging/discharging required power Pb has a positive value, it represents that charging is required for the power storage device 60. When the charging/discharging required power Pb has a negative value, it represents that discharging is required for the power storage device 60.

Figure 4:
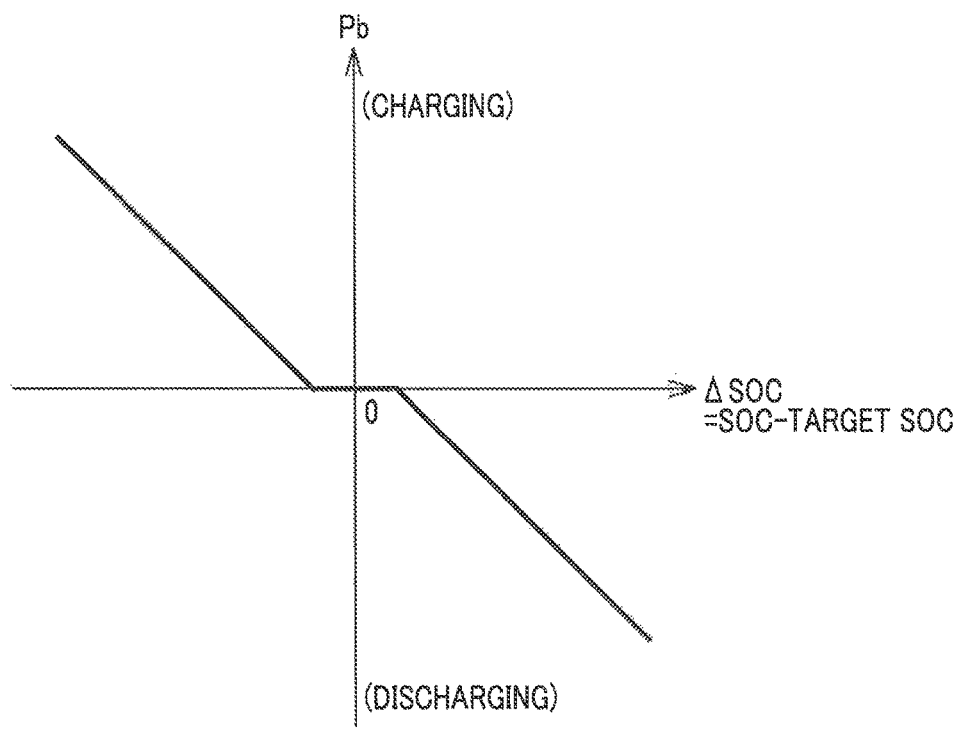
FIG. 4 is a diagram illustrating an example of a method of calculating a charging/discharging required power.

FIG. 4 is a diagram illustrating an example of a method of calculating the charging/discharging required power Pb. Referring to FIG. 4, when the difference ΔSOC between the SOC (the actual value) of the power storage device 60 and the target SOC indicating a control target of the SOC has a positive value (SOC>target SOC), the charging/discharging required power Pb has a negative value (discharging request) and the absolute value of the charging/discharging required power Pb increases as the absolute value of the difference ΔSOC increases. On the other hand, when the difference ΔSOC has a negative value (SOC<target SOC), the charging/discharging required power Pb has a positive value (charging request) and the absolute value of the charging/discharging required power Pb increases as the absolute value of the difference ΔSOC increases. In this example, there is provided a dead zone in which the charging/discharging required power Pb is set to 0 when the absolute value of the difference ΔSOC is small.

Referring to FIG. 3 again, the HV-ECU 100 calculates a total sum of the driving power Pd calculated in Step S20, the charging/discharging required power Pb calculated in Step S25, and a predetermined system loss Ploss as an engine required power Pe required for the engine 10 (Step S30) as expressed by Equation (1).

$$Pc = Pd + Pb + P\text{loss} \quad (1)$$

Subsequently, the HV-ECU 100 determines whether the calculated engine required power Pe is higher than a predetermined engine start threshold value Peth (Step S35). The engine start threshold value Peth is set to a value at which the engine 10 can be operated with an operation efficiency higher than a predetermined operation efficiency.

When it is determined in Step S35 that the engine required power Pe is higher than the threshold value Peth (YES in Step S35), the HV-ECU 100 controls the engine 10 such that the engine 10 is started (Step S40). When the engine 10 is already operating, this step is skipped. Then, the HV-ECU 100 controls the engine 10 and the PCU 50 such that the vehicle 1 travels using output powers from both the engine 10 and the second MG 30. That is, the vehicle 1 performs hybrid traveling (HV traveling) using the output powers of the engine 10 and the second MG 30 (Step S45).

On the other hand, when it is determined in Step S35 that the engine required power Pe is equal to or lower than the threshold value Peth (NO in Step S35), the HV-ECU 100 controls the engine 10 such that the engine 10 is stopped (Step S50). When the engine 10 is already stopped, this step is skipped. Then, the HV-ECU 100 controls the PCU 50 such that the vehicle 1 travels using only the output power from the second MG 30. That is, the vehicle 1 performs motor traveling (EV traveling) using the output power of the second MG 30 (Step S55).

Although not particularly illustrated in the drawing, the HV-ECU 100 controls the engine 10 such that the engine 10 is forcibly started to perform forcible charging of the power storage device 60 using the first MG 20 even when the SOC of the power storage device 60 decreases to a lower limit value SL and the engine required power Pe is equal to or lower than the engine start threshold value Peth. On the other hand, when the SOC of the power storage device 60 increases to an upper limit value SU, the HV-ECU 100 restricts charging of the power storage device 60 by setting an upper limit power Win indicating an upper limit value of an input power to the power storage device 60 to 0 or the like.

When the SOC (actual value) is higher than the target SOC (ΔSOC>0), it can be understood that the charging/discharging required power Pb has a negative value and thus it is more difficult to start the engine 10 because the engine required power Pe is lower than when the SOC has been controlled such that it is the target SOC. As a result, discharging of the power storage device 60 is promoted and the SOC exhibits a decreasing trend.

On the other hand, when the SOC is lower than the target SOC (ΔSOC<0), it can be understood that the charging/discharging required power Pb has a positive value and thus it is easier to start the engine 10 because the engine required power Pe is higher than when the SOC is controlled to the target SOC. As a result, charging of the power storage device 60 is promoted and the SOC exhibits an increasing trend.

SOC control which is performed by the HV-ECU 100 will be described below. As described above, the SOC control which is performed by the HV-ECU 100 includes (1) "congestion SOC control" which is performed when a congested section as a control target is present in a scheduled traveling route, (2) "downhill SOC control" which is performed when a downhill section as a control target is present in a scheduled traveling route, and (3) "uphill SOC control" which is performed when an uphill section as a control target is present in a scheduled traveling route. Hereinafter, the SOC control routines will be described.

<Congestion SOC Control>

Figure 5:
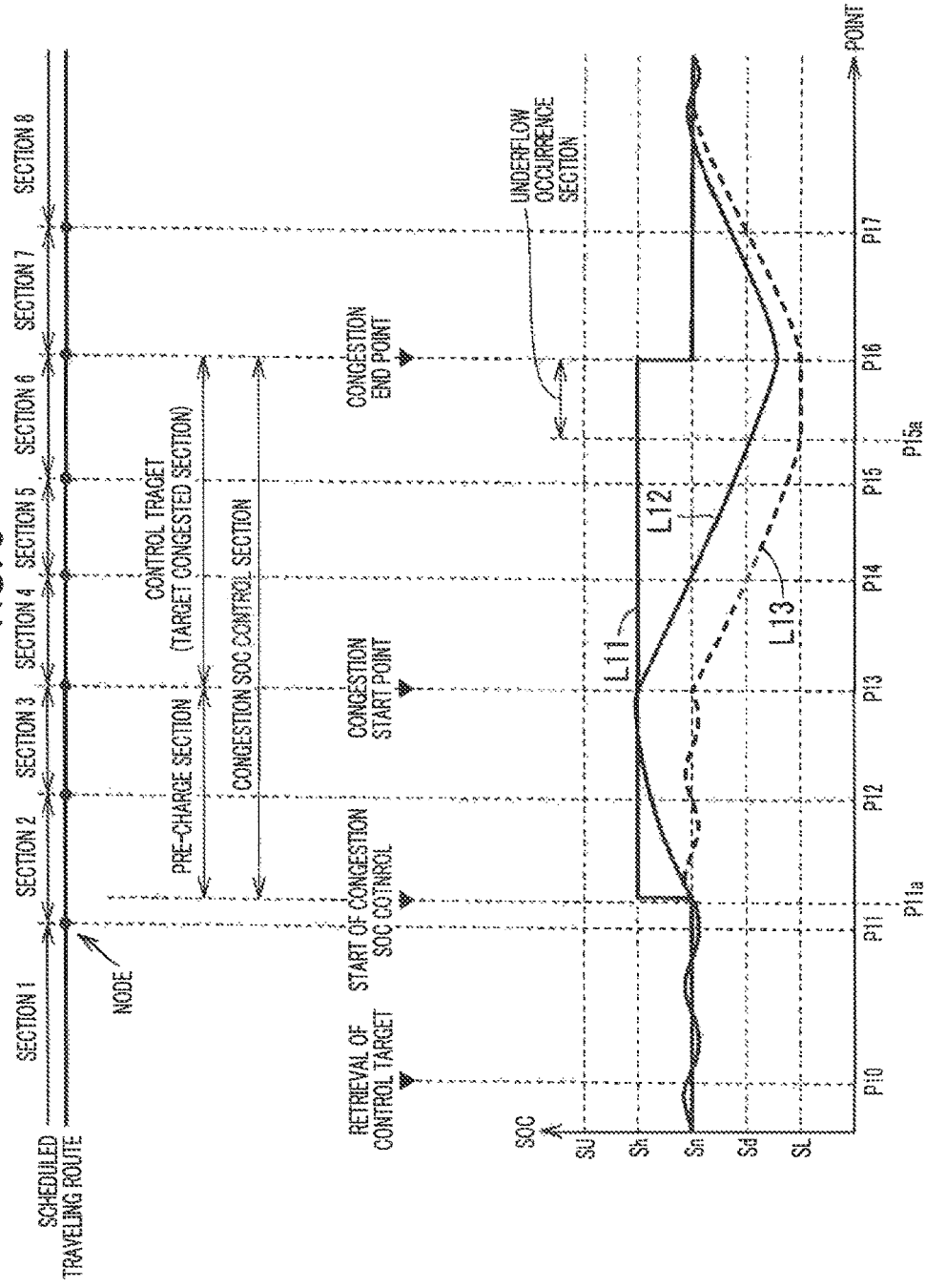
FIG. 5 is a diagram illustrating congestion SOC control.

FIG. 5 is a diagram illustrating congestion SOC control. Referring to FIG. 5, the horizontal axis represents points on a scheduled traveling route of the vehicle 1. In the illustrated example, sections 1 to 8 (links 1 to 8) of the scheduled traveling route are illustrated and a junction between neighboring sections is a node. In this example, it is assumed that sections 1 to 8 are level roads. The vertical axis represents the SOC of the power storage device 60.

The HV-ECU 100 acquires a current location of the vehicle 1, scheduled traveling route information, and road traffic information (congestion information) from the navigation device 130 and retrieves a congested section (a target congested section) which is a control target of the congestion SOC control based on the acquired information. For example, when congestion with a predetermined length or more occurs within a predetermined range (for example, 10 km) from the current location of the vehicle 1 in the scheduled traveling route, the HV-ECU 100 may specify the congested section as the target congested section. In the example illustrated FIG. 5, a control target (a target congested section) is retrieved at point P10, and sections 4 to 6 are specified as the target congested section.

Solid line L11 indicates a target SOC of the power storage device 60. Solid line L12 indicates change of the SOC when the congestion SOC control is being performed, and dotted line L13 indicates change of the SOC when the congestion SOC control is not performed as a comparative example.

The HV-ECU 100 sets the target SOC of the power storage device 60 to Sn when normal traveling is performed (when the SOC control is not performed) (for example, section 1, 7, or 8). When the vehicle 1 enters the congested section (sections 4 to 6) with the SOC of the power storage device 60 set to Sn, the EV traveling becomes dominant because the driving power is low in the congested section and thus the SOC decreases from Sn (dotted line L13). When the SOC decreases to the lower limit value SL at point P15a during traveling in the congested section (occurrence of underflow), the engine 10 is forcibly started even in a state in which the engine 10 cannot be operated at an optimal operating point, and forcible charging of the power storage device 60 is performed by the first MG 20. This forcible charging is performed to avoid underflow and to minimize degradation of the power storage device 60.

Therefore, in the vehicle 1 according to this embodiment, when the target congested section (sections 4 to 6) is specified and the vehicle 1 reaches point P11a a predetermined first distance prior to a start point P13 of the target congested section, the HV-ECU 100 changes the target SOC from Sn to Sh which is higher than Sn (solid line L11). Then, the SOC becomes lower than the target SOC (ΔSOC<0), charging of the power storage device 60 is promoted as described above, and thus the SOC increases (solid line L12 in sections 2 and 3).

The first distance is set to a distance sufficient to cause the SOC to approach Sh until the vehicle 1 arrives at the start point P13 of the target congested section. In FIG. 5, the SOC increases to Sh until the vehicle 1 arrives at the start point P13 of the target congested section. Accordingly, it is possible to prevent the SOC from decreasing to the lower limit value SL during traveling in the target congested section (sections 4 to 6) and to prevent forcible charging of the power storage device 60 which can be performed in a state in which the operation efficiency of the engine 10 is low.

When the vehicle 1 reaches an end point P16 of the target congested section, the HV-ECU 100 ends the congestion SOC control and returns the target SOC from Sh to Sn. The section from point P11a (a start point of the congestion SOC control) at which the target SOC is changed from Sn to Sh to the start point P13 of the target congested section is referred to as a "pre-charge section." The section (the section in which the target SOC is changed from Sn to Sh) in which the pre-charge section and the target congested section are combined is also referred to as a "congestion SOC control section."

<Downhill SOC Control>

Figure 6:
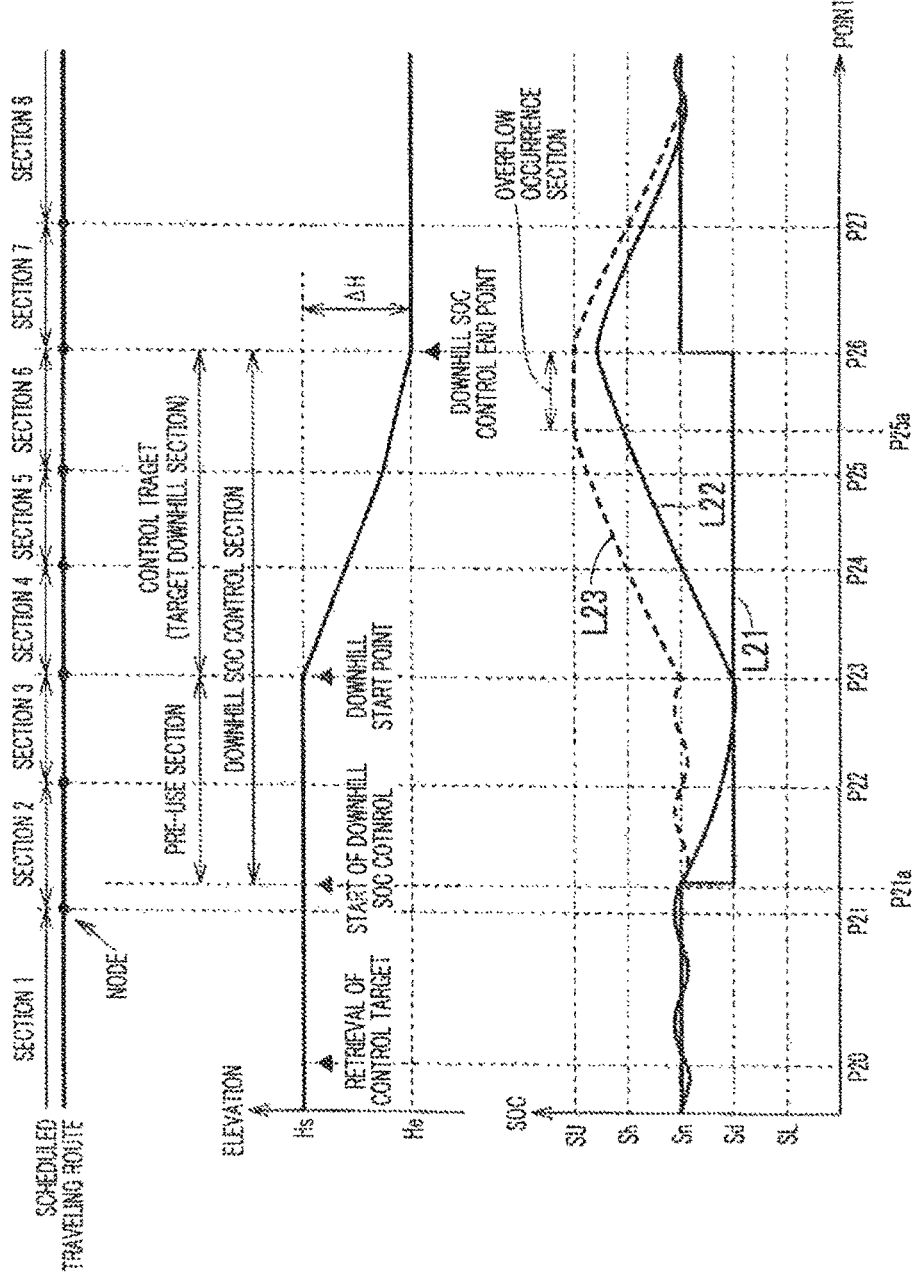
FIG. 6 is a diagram illustrating downhill SOC control.

FIG. 6 is a diagram illustrating downhill SOC control. Referring to FIG. 6, the horizontal axis represents points on a scheduled traveling route of the vehicle 1. In the example illustrated in FIG. 6, similarly to in the example illustrated in FIG. 5, sections 1 to 8 of the scheduled traveling route are illustrated. The vertical axis represents elevations of roads of the sections and the SOC of the power storage device 60.

The HV-ECU 100 acquires a current location of the vehicle 1 and scheduled traveling route information from the navigation device 130 and retrieves a downhill section (a target downhill section) which is a control target of the downhill SOC control based on the acquired information. For example, when a downhill road with a predetermined elevation difference and a predetermined length or more is present within a predetermined range (for example, 10 km) from the current location of the vehicle 1 in the scheduled traveling route, the HV-ECU 100 specifies the downhill section as the target downhill section. In the example illustrated FIG. 6, a control target (a target downhill section) is retrieved at point P20, and sections 4 to 6 are specified as the target downhill section.

Solid line L21 indicates a target SOC of the power storage device 60. Solid line L22 indicates change of the SOC when the downhill SOC control is being performed, and dotted line L23 indicates change of the SOC when the downhill SOC control is not performed as a comparative example.

As described above, the HV-ECU 100 sets the target SOC of the power storage device 60 to Sn when normal traveling is performed (for example, section 1, 7, or 8). When the vehicle 1 enters the downhill section (sections 4 to 6) with the SOC of the power storage device 60 set to Sn, regenerative power generation is performed by the second MG 30 to charge the power storage device 60 in the downhill section and thus the SOC increases from Sn (dotted line L23). When the SOC increases to the upper limit value SU at point P25a during traveling in the downhill section (occurrence of overflow), regenerative power generated by the second MG 30 is not stored in the power storage device 60 in spite of traveling in the downhill road, recoverable energy is wasted, and degradation of the power storage device 60 is also promoted.

Therefore, in the vehicle 1 according to this embodiment, when the target downhill section (sections 4 to 6) is specified and the vehicle 1 reaches point P21a a predetermined second distance prior to a start point P23 of the target downhill section, the HV-ECU 100 changes the target SOC from Sn to Sd which is lower than Sn (solid line L21). Then, the SOC becomes higher than the target SOC (ΔSOC>0), discharging of the power storage device 60 is promoted as described above, and thus the SOC decreases (solid line L22 in sections 2 and 3).

The second distance is set to a distance sufficient to cause the SOC to approach Sd until the vehicle 1 arrives at the start point P23 of the target downhill section. In FIG. 6, the SOC decreases to Sd until the vehicle 1 arrives at the start point P23 of the target downhill section. Accordingly, it is possible to prevent the SOC from increasing to the upper limit value SU during traveling in the target downhill section (sections 4 to 6) and to prevent a decrease in fuel efficiency due to degradation of the power storage device 60 or wasting of recoverable energy.

When the vehicle 1 reaches an end point P26 of the target downhill section, the HV-ECU 100 ends the downhill SOC control and returns the target SOC from Sd to Sn. The section from point P21a (a start point of the downhill SOC control) at which the target SOC is changed from Sn to Sd to the start point P23 of the target downhill section is referred to as a "pre-use section." The section (the section in which the target SOC is changed from Sn to Sd) in which the pre-use section and the target downhill section are combined is also referred to as a "downhill SOC control section."

<Uphill SOC Control>

Figure 7:
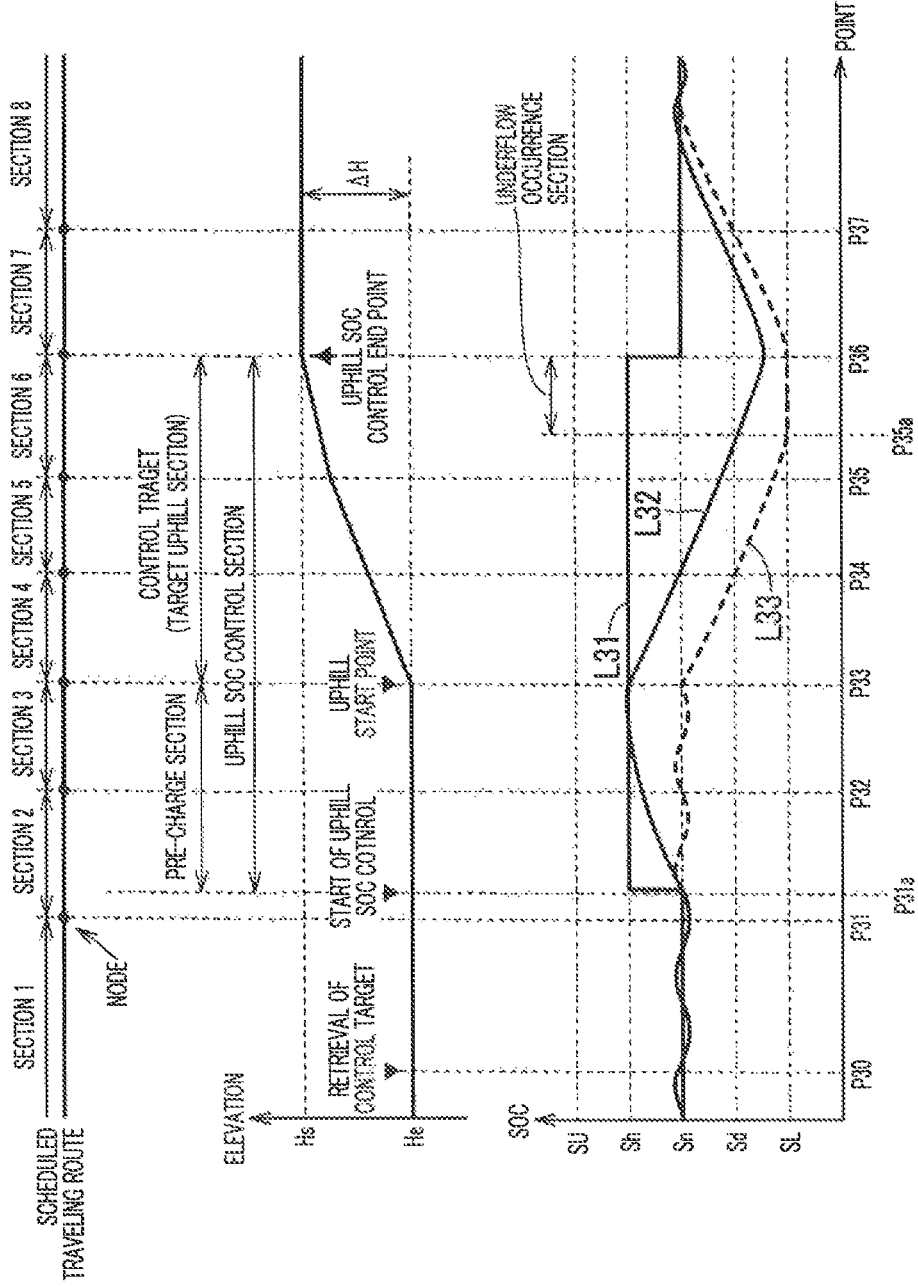
FIG. 7 is a diagram illustrating uphill SOC control.

FIG. 7 is a diagram illustrating uphill SOC control. Referring to FIG. 7, the horizontal axis represents points on a scheduled traveling route of the vehicle 1. In the example illustrated in FIG. 7, similarly to in the example illustrated in FIG. 5, sections 1 to 8 of the scheduled traveling route are illustrated. The vertical axis represents elevations of roads of the sections and the SOC of the power storage device 60.

The HV-ECU 100 acquires a current location of the vehicle 1 and scheduled traveling route information from the navigation device 130 and retrieves an uphill section (a target uphill section) which is a control target of the uphill SOC control based on the acquired information. For example, when an uphill road with a predetermined elevation difference and a predetermined length or more is present within a predetermined range (for example, 10 km) from the current location of the vehicle 1 in the scheduled traveling route, the HV-ECU 100 specifies the uphill section as the target uphill section. In the example illustrated FIG. 7, a control target (a target uphill section) is retrieved at point P30, and sections 4 to 6 are specified as the target uphill section.

Solid line L31 indicates a target SOC of the power storage device 60. Solid line L32 indicates change of the SOC when the uphill SOC control is being performed, and dotted line L33 indicates change of the SOC when the uphill SOC control is not performed as a comparative example.

As described above, the HV-ECU 100 sets the target SOC of the power storage device 60 to Sn when normal traveling is performed (for example, section 1, 7, or 8). When the vehicle 1 enters the uphill section (sections 4 to 6) with the SOC of the power storage device 60 set to Sn, the electric power stored in the power storage device 60 is consumed by the second MG 30 because a high driving power is required in the uphill section, and thus the SOC decreases from Sn (dotted line L33). When the SOC decreases to the lower limit value SL at point P35a during traveling in the uphill section (occurrence of underflow), the engine 10 is operated such that a higher power is output at an operating point departing from an optimal operating point, and forcible charging of the power storage device 60 is performed by the first MG 20.

Therefore, in the vehicle 1 according to this embodiment, when the target uphill section (sections 4 to 6) is specified and the vehicle 1 reaches point P31a a predetermined third distance prior to a start point P33 of the target uphill section, the HV-ECU 100 changes the target SOC from Sn to Sh which is higher than Sn (solid line L31). Then, the SOC becomes lower than the target SOC (ΔSOC<0), charging of the power storage device 60 is promoted as described above, and thus the SOC increases (solid line L32 in sections 2 and 3).

Similarly to the example in which the congestion SOC control is being performed, the target SOC is changed from Sn to Sh, but the target SOC during execution of the uphill SOC control may be different from the target SOC during execution of the congestion SOC control. The third distance is set to a distance sufficient to cause the SOC to approach Sh until the vehicle 1 arrives as the start point P33 of the target uphill section. In FIG. 7, the SOC increases to Sh until the vehicle 1 arrives at the start point P33 of the target uphill section. Accordingly, it is possible to prevent the SOC from decreasing to the lower limit value SL during traveling in the target uphill section (sections 4 to 6) and to prevent forcible charging of the power storage device 60 which can be performed in a state in which the operation efficiency of the engine 10 is low.

When the vehicle 1 reaches an end point P36 of the target uphill section, the HV-ECU 100 ends the uphill SOC control and returns the target SOC from Sh to Sn. The section from point P31a (a start point of the uphill SOC control) at which the target SOC is changed from Sn to Sh to the start point P33 of the target uphill section is referred to as a "pre-charge section." The section (the section in which the target SOC is changed from Sn to Sh) in which the pre-charge section and the target uphill section are combined is also referred to as an "uphill SOC control section."

<Display Control Based on SOC Control>

During execution of the SOC control, the HV-ECU 100 controls the HMI device 140 such that that the SOC control is being performed is displayed. Accordingly, a driver can be aware that the SOC of the power storage device 60 is changed due to execution of the SOC control.

Figure 8:
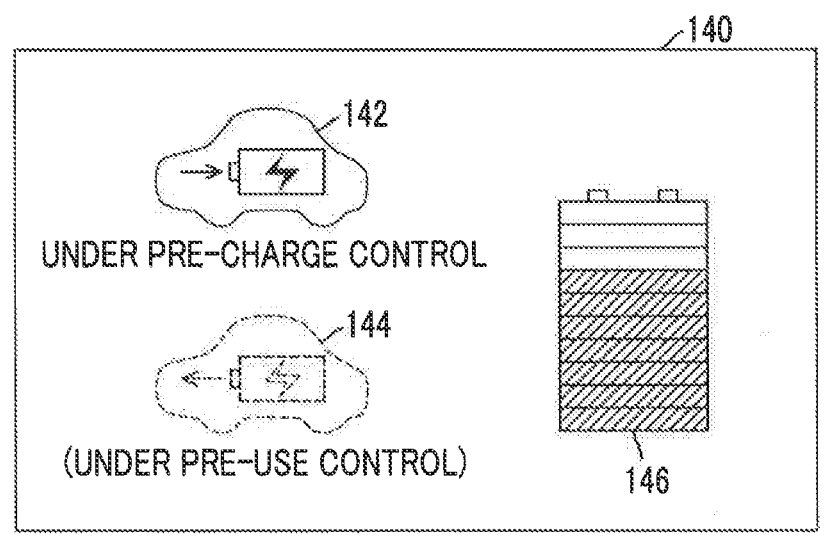
FIG. 8 is a diagram illustrating an example of a display state of an HMI device when SOC control is being performed.

FIG. 8 is a diagram illustrating an example of a display state of the HMI device 140 during execution of the SOC control. Referring to FIG. 8, icon 142 is displayed to be "under pre-charge control" on the HMI device 140 during execution of the congestion SOC control or the uphill SOC control in which the target SOC is changed from Sn to Sh which is higher than Sn. On the other hand, icon 144 is displayed to be "under pre-used control" on the HMI device 140 during execution of the downhill SOC control in which the target SOC is changed from Sn to Sd which is lower than Sn. Icon 146 visually shows a change in SOC in the SOC control and thus represents the SOC of the power storage device 60.

Referring to FIGS. 5 to 7 again, the SOC control (the congestion SOC control, the downhill SOC control, or the uphill SOC control) is started, for example, several km prior to a control target (a target congested section, a target downhill section, or a target uphill section).

Accordingly, the SOC control may be performed at a time at which a control target (for example, a congested section) is not displayed on the map of the HMI device 140 yet and a driver is not aware of the control target. In this case, icon 142 or icon 144 (see FIG. 8) representing that the SOC control is being performed is displayed on the HMI device 140, there is a likelihood that the driver will feel discomfort.

Therefore, in the vehicle 1 according to the first embodiment, that the SOC control is being performed is not displayed on the HMI device 140 until the distance from the current location of the vehicle 1 to a start point of the control target is less than a predetermined distance after the SOC control is started. Specifically, icon 142 and icon 144 are not displayed on the HMI device 140. Accordingly, it is not possible to display that the SOC control is being performed in a state in which a driver cannot be aware of a control target because the control target is present very remote from now on, and it is possible to start display of the SOC control in execution (display of icon 142 or icon 144) on the HMI device 140 after the distance to a start point of the control target is less than the predetermined distance and thus the driver can be aware of the control target. Accordingly, according to the vehicle 1, it is possible to decrease a driver's discomfort due to display of the SOC control in execution.

Figure 9:
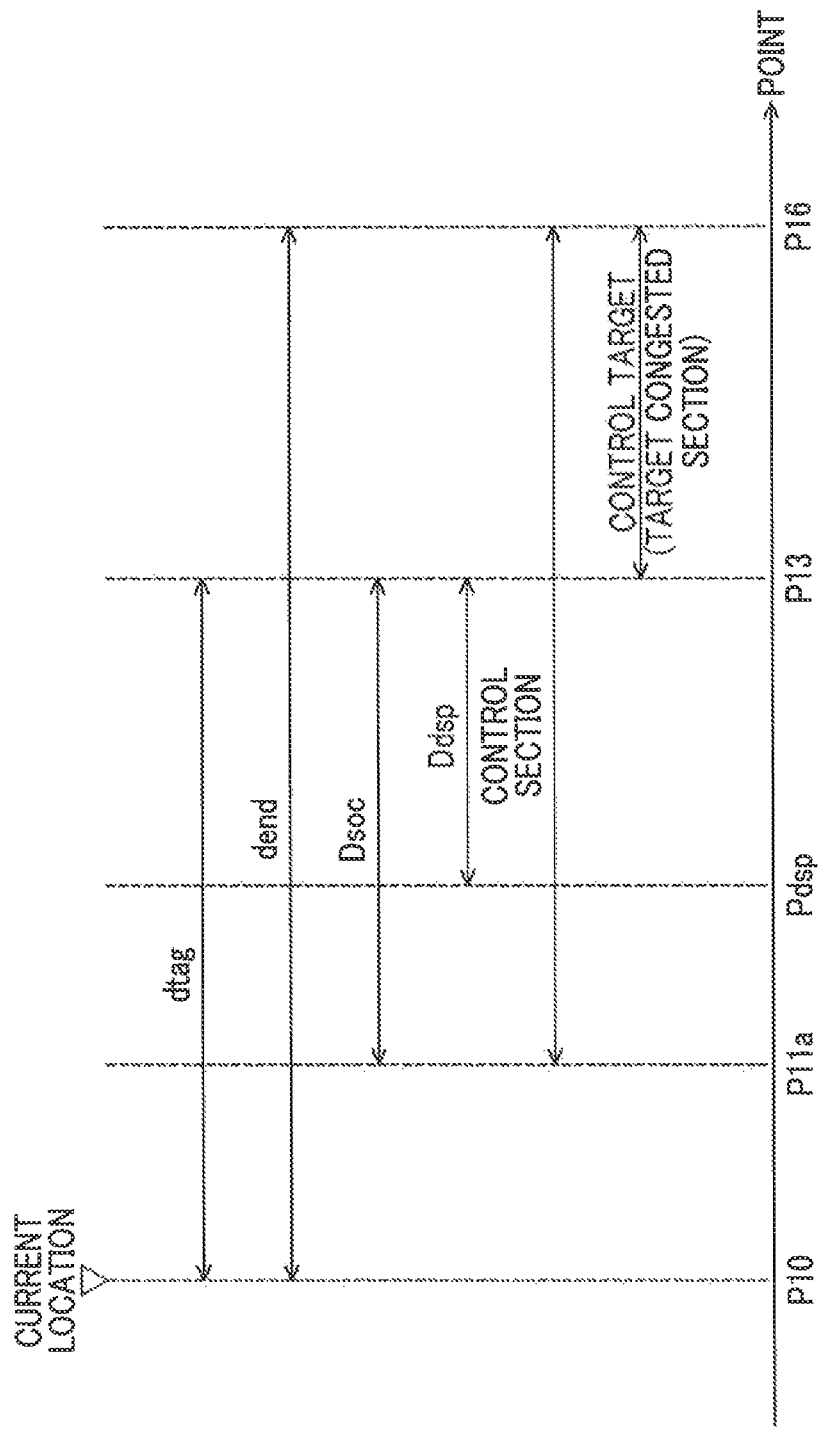
FIG. 9 is a diagram illustrating a relationship between an execution start time of SOC control and a display start time of the SOC control in the HMI device.

FIG. 9 is a diagram illustrating a relationship between an execution start time of the SOC control and a display start time of the SOC control on the HMI device 140. In FIG. 9, the congestion SOC control described above with reference to FIG. 5 is representatively described, but the same description is true of the downhill SOC control and the uphill SOC control described above with reference to FIGS. 6 and 7.

Referring to FIG. 9, the horizontal axis represents points on a scheduled traveling route of the vehicle 1. A section from point P13 to point P16 is a control target of the congestion SOC control (a target congested section). A distance dtag represents a distance from point P10 which is the current location of the vehicle 1 to a start point P13 of the target congested section. A distance dend represents a distance from the current location (point P10) of the vehicle 1 to an end point P16 of the target congested section.

When the distance dtag is less than a predetermined distance Dsoc, the congestion SOC control is started. That is, point P11a which is the distance Dsoc prior to the start point P13 of the target congested section represents an execution start time of the congestion SOC control. The distance Dsoc is set to a distance (for example, 5 km) sufficient to cause the SOC to approach Sh (see FIG. 5) until the vehicle 1 reaches the start point P13 of the target congested section.

When the distance dtag is less than a predetermined distance Ddsp (Ddsp<Dsoc) after the congestion SOC control is started, display of the congestion SOC control in execution (display of icon 142 (see FIG. 8)) on the HMI device 140 is started. That is, point Pdsp which is a predetermined distance Ddsp prior to the start point P13 of the target congested section represents a display start time of the congestion SOC control. It is preferable that the predetermined distance Ddsp be a distance in which a driver can be aware of the target congested section on the HMI device 140, for example, a distance (for example, 2 km to 3 km) in which the current location of the vehicle 1 and the target congested section can be displayed on a map displayed on the HMI device 140. The predetermined distance Ddsp may be changed depending on a scale of the map displayed on the HMI device 140.

The above-mentioned display control is useful for the congestion SOC control, the downhill SOC control, and the uphill SOC control, and is particularly effective for the congestion SOC control. That is, since road traffic information (congestion information) acquired from the navigation device 130 is updated at predetermined time intervals (for example, five minutes), specification of the target congested section may be delayed by a total time of an update cycle (five minutes) of the road traffic information and a cycle (for example, one minute) for retrieving the target congested section. Accordingly, the execution start time of the congestion SOC control which is determined based on the start point of the target congested section may vary, and thus the HV-ECU 100 causes the HMI device 140 to display that the congestion SOC control is being performed at a time at which the vehicle 1 passes through a point which is the predetermined distance Ddsp prior to the start point of the target congested section after the congestion control is started. Accordingly, even when the start time of the congestion SOC control varies, it is possible to minimize variation of the display start time of the congestion SOC control and to decrease a driver's discomfort.

<Control Flow of SOC Control>

Figure 10:
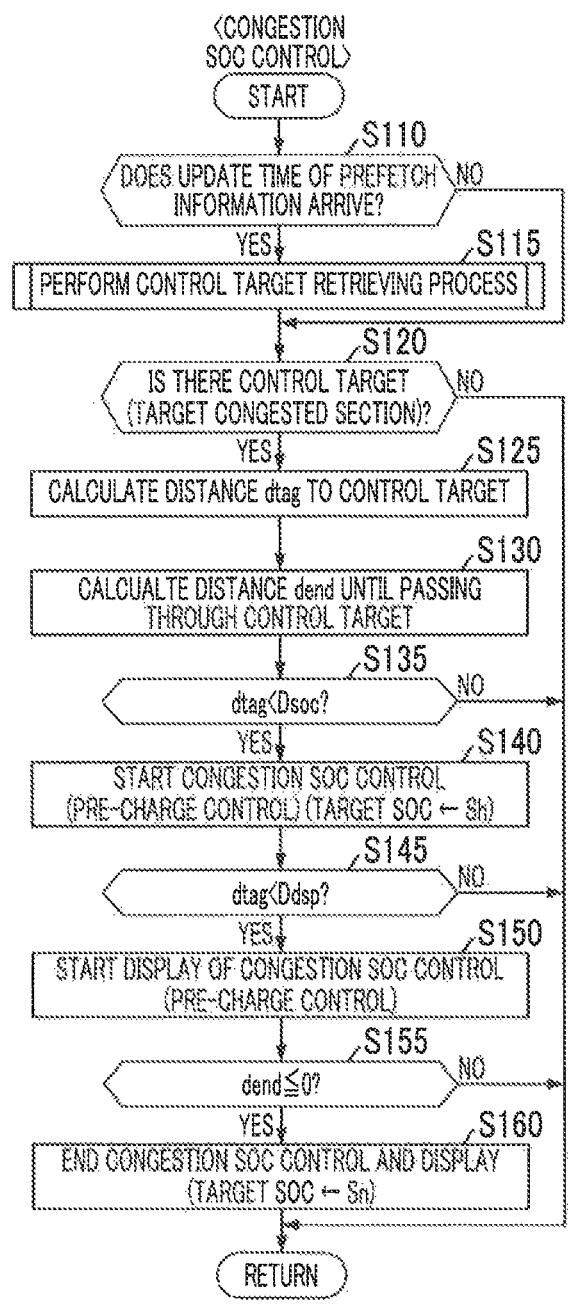
FIG. 10 is a flowchart illustrating a process flow of congestion SOC control which is performed by the HV-ECU.

FIG. 10 is a flowchart illustrating a process flow of the congestion SOC control which is performed by the HV-ECU 100. A series of processes which is illustrated in the flowchart is repeatedly performed at predetermined time intervals, for example, when a system switch or the like of the vehicle 1 is turned on.

Referring to FIG. 10, the HV-ECU 100 determines whether an update time of prefetch information arrives (Step S110). The prefetch information includes information of a road section within a predetermined range (for example, 10 km) from the current location of the vehicle 1 in a scheduled traveling route and information on a control target (a target congested section) which is retrieved from the road section. Examples of the update time of the prefetch information include a time at which a traveling route of the vehicle 1 is changed (the vehicle 1 departs from the scheduled traveling route), a time at which road traffic information (congestion information) is updated, a time at which a predetermined time (for example, one minute) has elapsed, a time at which the vehicle travels a predetermined distance, and a time at which the vehicle has passed through a control target (a target congested section).

When it is determined in Step S110 that the update time of the prefetch information arrives (YES in Step S110), the HV-ECU 100 performs a process of retrieving a control target (a target congested section) based on scheduled traveling route information and road traffic information (congestion information) acquired from the navigation device 130 (Step S115). This retrieving process will be described later. When it is determined in Step S110 that the update time of the prefetch information does not arrive (NO in Step S110), the HV-ECU 100 performs the process of Step S120 without performing the process of Step S115.

Subsequently, the HV-ECU 100 determines whether a control target (a target congested section) is present in the scheduled traveling route (Step S120). More specifically, it is determined whether a control target (a target congested section) is present within a predetermined range (for example, 10 km) from the current location of the vehicle 1 in the scheduled traveling route. When it is determined that no control target (target congested section) is present in the scheduled traveling route (NO in Step S120), the HV-ECU 100 restarts the process flow without performing a subsequent series of processes.

When it is determined in Step S120 that a control target (a target congested section) is present in the scheduled traveling route (YES in Step S120), the HV-ECU 100 calculates a distance dtag (see FIG. 9) from the current location of the vehicle 1 to the start point of the control target (the target congested section) based on the prefetch information (see FIG. 9) (Step S125). In addition, the HV-ECU 100 calculates the distance dend from the current location of the vehicle 1 until the vehicle passes through the control target (the target congested section) based on the prefetch information (see FIG. 9) (Step S130).

The HV-ECU 100 determines whether the distance dtag calculated in Step S125 is less than the distance Dsoc (see FIG. 9) (Step S135). When the distance dtag is equal to or greater than Dsoc (NO in Step S135), the HV-ECU 100 restarts the process flow without performing the subsequent processes.

When it is determined in Step S135 that the distance dtag is less than the distance Dsoc (YES in Step S135), the HV-ECU 100 starts the congestion SOC control (the pre-charge control) (Step S140). Specifically, as described above with reference to FIG. 5, the HV-ECU 100 changes the target SOC of the power storage device 60 from Sn to Sh which is higher than Sn. Accordingly, the SOC of the power storage device 60 is increased in advance before the vehicle 1 enters the control target (the target congested section). When the congestion SOC control is already being performed, performing of the congestion SOC control is maintained.

Subsequently, the HV-ECU 100 determines whether the distance dtag calculated in Step S125 is less than a predetermined distance Ddsp (see FIG. 9) (Step S145). As described above, the predetermined distance Ddsp is less than the distance Dsoc. When the distance dtag is equal to or greater than the predetermined distance Ddsp (NO in Step S145), the HV-ECU 100 restarts the process flow without performing the subsequent processes.

When it is determined in Step S145 that the distance dtag is less than the predetermined distance Ddsp (YES in Step S145), the HV-ECU 100 starts display of the congestion SOC control (pre-charge control) in execution on the HMI device 140 (Step S150). Specifically, icon 142 (see FIG. 8) indicating that the pre-charge control is being performed is displayed on the HMI device 140. Accordingly, a driver can be aware that the congestion SOC control (pre-charge control) is performed. When it is already displayed that the congestion SOC control is being performed, the display is maintained.

Subsequently, the HV-ECU 100 determines whether the distance dend calculated in Step S130 is equal to or less than 0 (Step S155). When the distance dend is greater than 0 (NO in Step S155), the HV-ECU 100 restarts the process flow.

When it is determined in Step S155 that the distance dend is equal to or less than 0 (YES in Step S155), the HV-ECU 100 ends the congestion SOC control (the pre-charge control) and ends display on the HMI device 140 (Step S160). Specifically, the HV-ECU 100 returns the target SOC of the power storage device 60 from Sh to Sn and does not display icon 142 on the HMI device 140.

Through the above-mentioned series of processes, when the distance dtag from the current location of the vehicle 1 to the start point of the target congested section is less than the distance Dsoc, the congestion SOC control is started. Thereafter, that the congestion SOC control is being performed is not displayed on the HMI device 140 until the distance dtag is less than the predetermined distance Ddsp (Ddsp<Dsoc) (NO in Step S145), and that the congestion SOC control (the pre-charge control) is being performed is displayed on the HMI device 140 when the distance dtag is less than the predetermined distance Ddsp (YES in Step S145).

Figure 11:
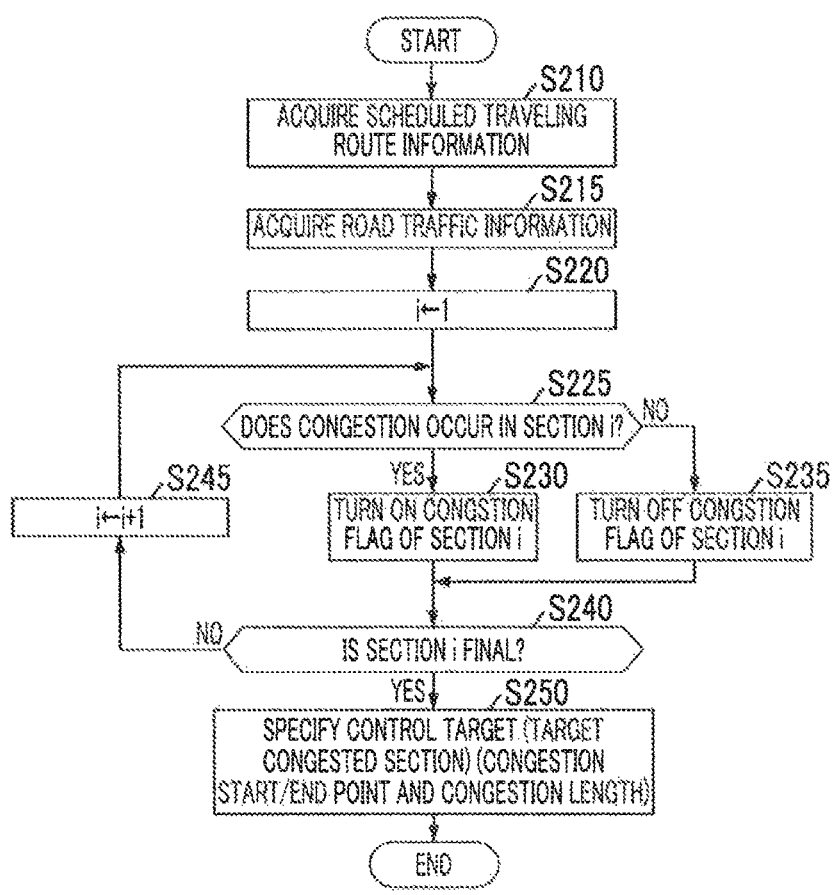
FIG. 11 is a flowchart illustrating an example of a control target retrieving process which is performed in Step S115 in FIG. 10.

FIG. 11 is a flowchart illustrating an example of the process of retrieving a control target which is performed in Step S115 in FIG. 10. Referring to FIG. 11, the HV-ECU 100 acquires scheduled traveling route information from the navigation device 130 (Step S210). Specifically, the scheduled traveling route information includes information on a road section within a predetermined range (for example, 10 km) from the current location of the vehicle 1 in the scheduled traveling route, a set of nodes and links of the road section, and gradient information of the links. Hereinafter, the total number of links (sections) included in the scheduled traveling route information is also referred to as a "total number of prefetch data pieces." The HV-ECU 100 acquires road traffic information including the congestion information from the navigation device 130 (Step S215).

The HV-ECU 100 defines a section (a link) to which the current location of the vehicle 1 belongs in the road section acquired as the scheduled traveling route information as section 1, and numbers the sections subsequent to section 1 like section 2, section 3, . . . for convenience. The HV-ECU 100 sets a counter i to an initial value "1" (Step S220).

Subsequently, the HV-ECU 100 determines whether congestion occurs in section i based on the congestion information acquired in Step S215 (Step S225). Specifically, the congestion information includes information on a congestion occurrence point and a degree of congestion (a numerical value corresponding to a degree of congestion), and the HV-ECU 100 determines that congestion occurs in section i, for example, when congestion with a degree of congestion of a predetermined value or more occurs in a considerable part of section i.

When it is determined in Step S225 that congestion occurs in section i (YES in Step S225), the HV-ECU 100 sets a congestion flag of section i to an ON state (Step S230). On the other hand, when it is determined in Step S225 that congestion does not occur in section i (NO in Step S225), the HV-ECU 100 sets the congestion flag of section i to an OFF state (Step S235).

The HV-ECU 100 determines whether section i is a final section in the road section acquired as the scheduled traveling route information (Step S240). Specifically, the HV-ECU 100 determines whether the counter i reaches the total number of prefetch data pieces (the total number of sections included in the scheduled traveling route information). When it is determined that section i is not a final section (NO in Step S240), the HV-ECU 100 counts up the counter i (Step S245) and returns the process flow to Step S225.

When it is determined in Step S240 that section i is a final section (YES in Step S240), the HV-ECU 100 specifies a control target (a target congested section) based on the congestion flag and distance information of each section (Step S250). For example, when predetermined conditions such as a condition in which one or more sections in which the congestion flag is in the ON state (hereinafter also referred to as a "congested section group") are continuously present and a condition in which the length of the congested section group (a congestion length) is greater than a distance L are satisfied, the HV-ECU 100 specifies the congested section group as the control target (the target congested section) of the congestion SOC control. Specifically, a congestion start point, a congestion end point, a congestion length (a length of the target congested section), and the like are specified for the control target (the target congested section).

In this way, the control target (the target congested section) is retrieved in Step S115 in FIG. 10.

Figure 12:
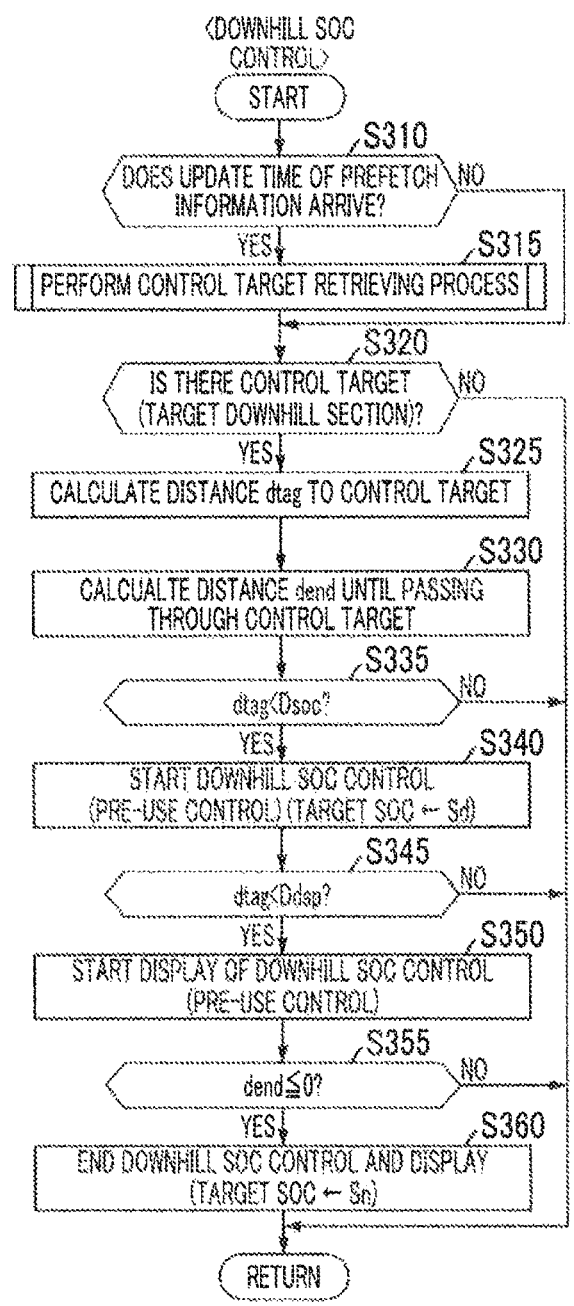
FIG. 12 is a flowchart illustrating a process flow of downhill SOC control which is performed by the HV-ECU.

FIG. 12 is a flowchart illustrating a process flow of the downhill SOC control which is performed by the HV-ECU 100. A series of processes which is illustrated in the flowchart is repeatedly performed at predetermined time intervals, for example, when a system switch or the like of the vehicle 1 is turned on.

Referring to FIG. 12, the HV-ECU 100 determines whether an update time of prefetch information arrives (Step S310). This process is the same as in Step S110 in FIG. 10 and description thereof will not be repeated.

When it is determined in Step S310 that the update time of the prefetch information arrives (YES in Step S310), the HV-ECU 100 performs a process of retrieving a control target (a target downhill section) based on scheduled traveling route information acquired from the navigation device 130 (Step S315). This retrieving process will be described later. When it is determined in Step S310 that the update time of the prefetch information does not arrive (NO in Step S310), the HV-ECU 100 performs the process of Step S320 without performing the process of Step S315.

Subsequently, the HV-ECU 100 determines whether a control target (a target downhill section) is present in the scheduled traveling route (Step S320). More specifically, it is determined whether a control target (a target downhill section) is present within a predetermined range (for example, 10 km) from the current location of the vehicle 1 in the scheduled traveling route. When it is determined that no control target (target downhill section) is present in the scheduled traveling route (NO in Step S320), the HV-ECU 100 restarts the process flow without performing a subsequent series of processes.

When it is determined in Step S320 that a control target (a target downhill section) is present in the scheduled traveling route (YES in Step S320), the HV-ECU 100 calculates a distance dtag from the current location of the vehicle 1 to the start time of the control target (the target downhill section) based on the prefetch information (Step S325). In addition, the HV-ECU 100 calculates the distance dend from the current location of the vehicle 1 until the vehicle passes through the control target (the target downhill section) based on the prefetch information (Step S330).

The HV-ECU 100 determines whether the distance dtag calculated in Step S325 is less than the distance Dsoc (see FIG. 9) (Step S335). When the distance dtag is equal to or greater than Dsoc (NO in Step S335), the HV-ECU 100 restarts the process flow without performing the subsequent processes.

When it is determined in Step S335 that the distance dtag is less than the distance Dsoc (YES in Step S335), the HV-ECU 100 starts the downhill SOC control (the pre-use control) (Step S340). Specifically, as described above with reference to FIG. 6, the HV-ECU 100 changes the target SOC of the power storage device 60 from Sn to Sd which is lower than Sn. Accordingly, the SOC of the power storage device 60 is decreased in advance before the vehicle 1 enters the control target (the target downhill section). When the downhill SOC control is already being performed, performing of the downhill SOC control is maintained.

Subsequently, the HV-ECU 100 determines whether the distance dtag calculated in Step S325 is less than a predetermined distance Ddsp (see FIG. 9) (Step S345). When the distance dtag is equal to or greater than the predetermined distance Ddsp (NO in Step S345), the HV-ECU 100 restarts the process flow without performing the subsequent processes.

When it is determined in Step S345 that the distance dtag is less than the predetermined distance Ddsp (YES in Step S345), the HV-ECU 100 starts display of the downhill SOC control (pre-use control) in execution on the HMI device 140 (Step S350). Specifically, icon 144 (see FIG. 8) indicating that the pre-use control is being performed is displayed on the HMI device 140. Accordingly, a driver can be aware that the downhill SOC control (pre-use control) is performed. When it is already displayed that the downhill SOC control is being performed, the display is maintained.

Subsequently, the HV-ECU 100 determines whether the distance dend calculated in Step S330 is equal to or less than 0 (Step S355). When the distance dend is greater than 0 (NO in Step S355), the HV-ECU 100 restarts the process flow.

When it is determined in Step S355 that the distance dend is equal to or less than 0 (YES in Step S355), the HV-ECU 100 ends the downhill SOC control (the pre-use control) and ends display on the HMI device 140 (Step S360). Specifically, the HV-ECU 100 returns the target SOC of the power storage device 60 from Sd to Sn and does not display icon 144 on the HMI device 140.

Through the above-mentioned series of processes, when the distance dtag from the current location of the vehicle 1 to the start point of the target downhill section is less than the distance Dsoc, the downhill SOC control is started. Thereafter, that the downhill SOC control is being performed is not displayed on the HMI device 140 until the distance dtag is less than the predetermined distance Ddsp (Ddsp<Dsoc) (NO in Step S345), and that the downhill SOC control (the pre-use control) is being performed is displayed on the HMI device 140 when the distance dtag is less than the predetermined distance Ddsp (YES in Step S345).

Figure 13:
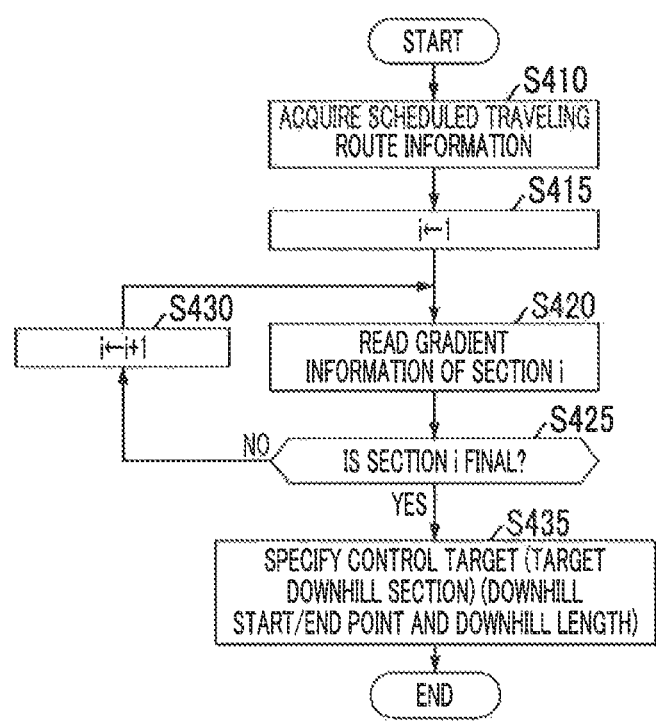
FIG. 13 is a flowchart illustrating an example of a control target retrieving process which is performed in Step S315 in FIG. 12.

FIG. 13 is a flowchart illustrating an example of the process of retrieving a control target which is performed in Step S315 in FIG. 12. Referring to FIG. 13, the HV-ECU 100 acquires scheduled traveling route information from the navigation device 130 (Step S410). This process is the same as in Step S210 in FIG. 11 and description thereof will not be repeated. The HV-ECU 100 sets a counter i to an initial value "1" (Step S415).

Subsequently, the HV-ECU 100 reads gradient information of section i (Step S240). The gradient information of section i is information of a link corresponding to section i, is stored in the map information DB 134 (see FIG. 2), and is added to information of section i included in the scheduled traveling route information acquired in Step S410.

The HV-ECU 100 determines whether section i is a final section in the road section acquired as the scheduled traveling route information (Step S425). When it is determined that section i is not a final section (NO in Step S425), the HV-ECU 100 counts up the counter i (Step S430) and returns the process flow to Step S420.

When it is determined in Step S425 that section i is a final section (YES in Step S425), the HV-ECU 100 specifies a control target (a target downhill section) based on distance information and gradient information of each section (Step S435). For example, when predetermined conditions such as a condition in which one or more sections with a downhill gradient in which the road gradient is equal to or greater than a predetermined gradient (hereinafter also referred to as a "downhill section group") are continuously present in the road section acquired as the scheduled traveling route information, a condition in which an elevation difference between a start point and an end point of the downhill section group is equal to or greater than a predetermined elevation difference, and a condition in which a length of the downhill section group is equal to or greater than a predetermined distance are satisfied, the HV-ECU 100 specifies the downhill section group as the control target (the target downhill section) of the downhill SOC control. Specifically, a downhill start point, a downhill end point, a downhill length (a length of the target downhill section), and the like are specified for the control target (the target downhill section).

In this way, the control target (the target downhill section) is retrieved in Step S315 in FIG. 12.

Figure 14:
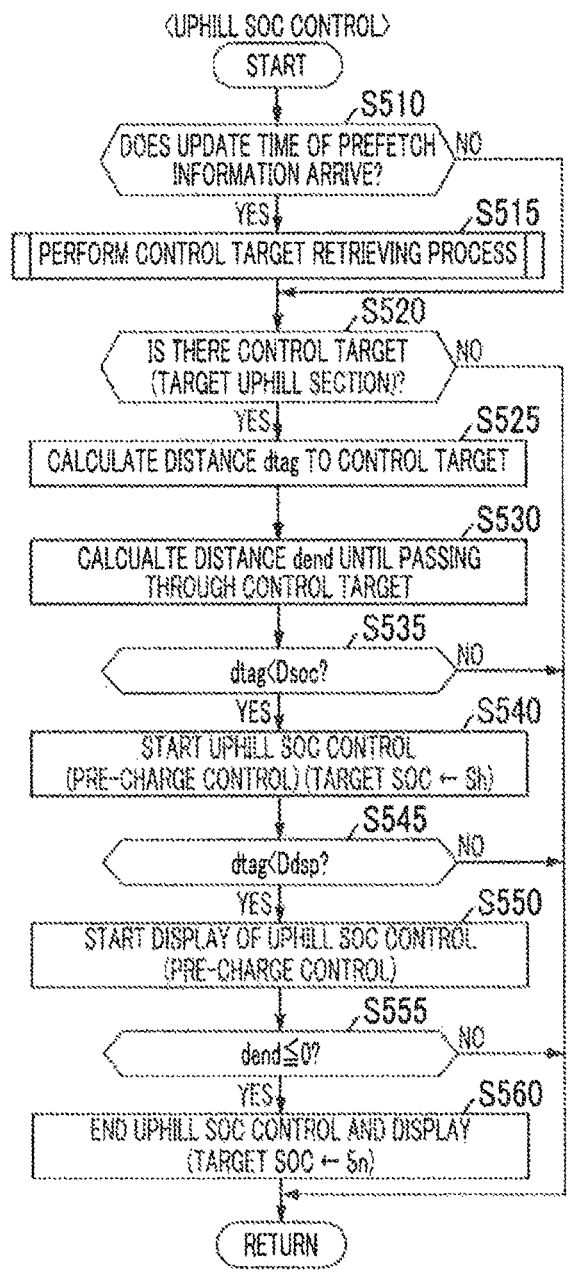
FIG. 14 is a flowchart illustrating a process flow of uphill SOC control which is performed by the HV-ECU.

FIG. 14 is a flowchart illustrating a process flow of the uphill SOC control which is performed by the HV-ECU 100. A series of processes which is illustrated in the flowchart is repeatedly performed at predetermined time intervals, for example, when a system switch or the like of the vehicle 1 is turned on.

Referring to FIG. 14, the process flow of the uphill SOC control is basically the same as the process flow of the downhill SOC control illustrated in FIG. 12, except for the difference between an uphill and a downhill. Specifically, the processes of Steps S510, S525 to S535, S545, and S555 are the same as the processes of Steps S310, S325 to S335, S345, and S355 illustrated in FIG. 12, and the processes of Steps S515, S520, S540, S550, and S56 are different from the processes of Steps S315, 320, S340, S350, and S360 illustrated in FIG. 12.

When it is determined in Step S510 that the update time of the prefetch information arrives (YES in Step S510), the HV-ECU 100 performs a process of retrieving a control target (a target uphill section) based on scheduled traveling route information acquired from the navigation device 130 (Step S515). This retrieving process will be described later.

Subsequently, the HV-ECU 100 determines whether a control target (a target uphill section) is present in the scheduled traveling route in Step S520. More specifically, it is determined whether a control target (a target uphill section) is present within a predetermined range (for example, 10 km) from the current location of the vehicle 1 in the scheduled traveling route.

When it is determined in Step S535 that the distance dtag is less than the distance Dsoc (YES in Step S535), the HV-ECU 100 starts the uphill SOC control (the pre-charge control) (Step S540). Specifically, as described above with reference to FIG. 7, the HV-ECU 100 changes the target SOC of the power storage device 60 from Sn to Sh which is higher than Sn. Accordingly, the SOC of the power storage device 60 is increased in advance before the vehicle 1 enters the control target (the target uphill section). When the uphill SOC control is already being performed, performing of the uphill SOC control is maintained.

When it is determined in Step S545 that the distance dtag is less than the predetermined distance Ddsp (YES in Step S545), the HV-ECU 100 starts display of the uphill SOC control (pre-charge control) in execution on the HMI device 140 (Step S550). Specifically, icon 142 (see FIG. 8) indicating that the pre-charge control is being performed is displayed on the HMI device 140. Accordingly, a driver can be aware that the uphill SOC control (pre-charge control) is performed. When it is already displayed that the uphill SOC control is being performed, the display is maintained.

When it is determined in Step S555 that the distance dend is equal to or less than 0 (YES in Step S555), the HV-ECU 100 ends the uphill SOC control (the pre-charge control) and ends display on the HMI device 140 (Step S560). Specifically, the HV-ECU 100 returns the target SOC of the power storage device 60 from Sh to Sn and does not display icon 142 on the HMI device 140.

Through the series of processes illustrated in FIG. 14, when the distance dtag from the current location of the vehicle 1 to the start point of the target uphill section is less than the distance Dsoc, the uphill SOC control is started. Thereafter, that the uphill SOC control is being performed is not displayed on the HMI device 140 until the distance dtag is less than the predetermined distance Ddsp (Ddsp<Dsoc) (NO in Step S545), and that the uphill SOC control (the pre-charge control) is performed is displayed on the HMI device 140 when the distance dtag is less than the predetermined distance Ddsp (YES in Step S545).

Figure 15:
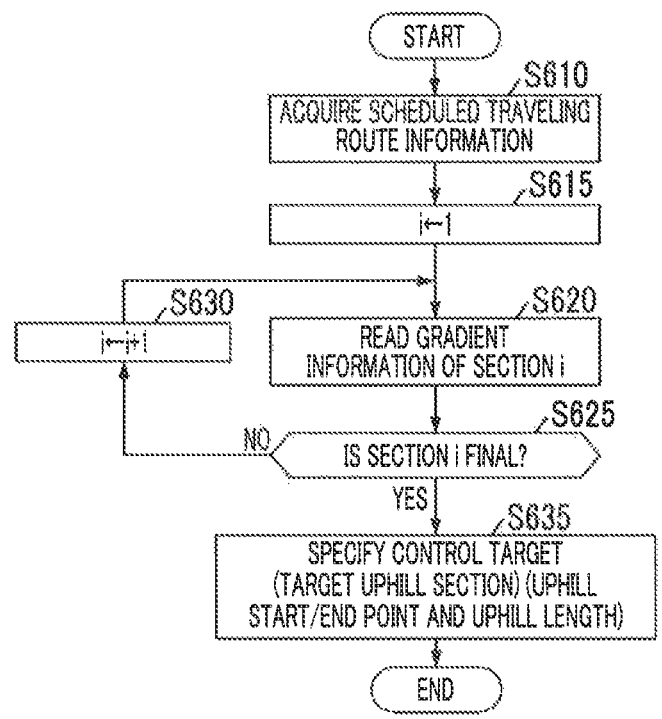
FIG. 15 is a flowchart illustrating an example of a control target retrieving process which is performed in Step S515 in FIG. 14.

FIG. 15 is a flowchart illustrating an example of the process of retrieving a control target which is performed in Step S515 in FIG. 14. Referring to FIG. 15, this process of retrieving a control target (a target uphill section) is basically the same as the process of retrieving a control target (a target downhill section) in FIG. 13, except for the difference between uphill and downhill. Specifically, the process of Step S635 is different from the process of Step S435 in FIG. 13.

That is, when it is determined in Step S625 that section i is a final section (YES in Step S625), the HV-ECU 100 specifies a control target (a target uphill section) based on distance information and gradient information of each section (Step S635). For example, when predetermined conditions such as a condition in which one or more sections with an uphill gradient in which the road gradient is equal to or greater than a predetermined gradient (hereinafter also referred to as an "uphill section group") are continuously present in the road section acquired as the scheduled traveling route information, a condition in which an elevation difference between a start point and an end point of the uphill section group is equal to or greater than a predetermined elevation difference, and a condition in which a length of the uphill section group is equal to or greater than a predetermined distance are satisfied, the HV-ECU 100 specifies the uphill section group as the control target (the target uphill section) of the downhill SOC control. Specifically, an uphill start point, an uphill end point, an uphill length (a length of the target uphill section), and the like are specified for the control target (the target uphill section).

In this way, the control target (the target uphill section) is retrieved in Step S515 in FIG. 14.

As described above, in the first embodiment, that the SOC control is being performed is not displayed on the HMI device 140 until the distance from the current location of the vehicle 1 to the start point of the control target is less than the predetermined distance Ddsp after the SOC control is started. Accordingly, according to the first embodiment, it is possible to decrease a driver's discomfort due to display of the SOC control in execution.

Particularly, as for the congestion SOC control, there is a likelihood that the execution start time of the congestion SOC control will vary. According to the first embodiment, that the congestion SOC control is being performed is displayed on the HMI device 140 at a time at which the vehicle 1 passes through a point which is the predetermined distance Ddsp prior to the start point of the target congested section after the congestion SOC control is started. Accordingly, even when the start time of the congestion SOC control varies, it is possible to minimize variation of the display start time of the congestion SOC control and to decrease a driver's discomfort.

Second Embodiment

As described above, before the vehicle 1 enters a control target (a target congested section, a target downhill section, or a target uphill section) of the SOC control, the SOC control is started and that the SOC control is being performed is displayed on the HMI device 140.

When two control targets are approached and display of next SOC control is started at an end time point of the first SOC control (at time point at which the vehicle passes through the first control target), display is maintained in spite of passing through the first control target, and thus there is a likelihood that a driver will feel discomfort.

Therefore, in a vehicle according to a second embodiment, even when display of next SOC control is required at an end time point of the SOC control, that the SOC control is being performed is not displayed until a predetermined time elapses after the SOC control ends. After the predetermined time elapses, display is started. Accordingly, a driver can be aware that the first SOC control has ended normally and thus it is possible to prevent a driver from feeling discomfort when sequential SOC control is performed.

The vehicle according to the second embodiment is the same as the vehicle 1 according to the first embodiment, except that a display process when sequential SOC control is performed is added.

Figure 16:
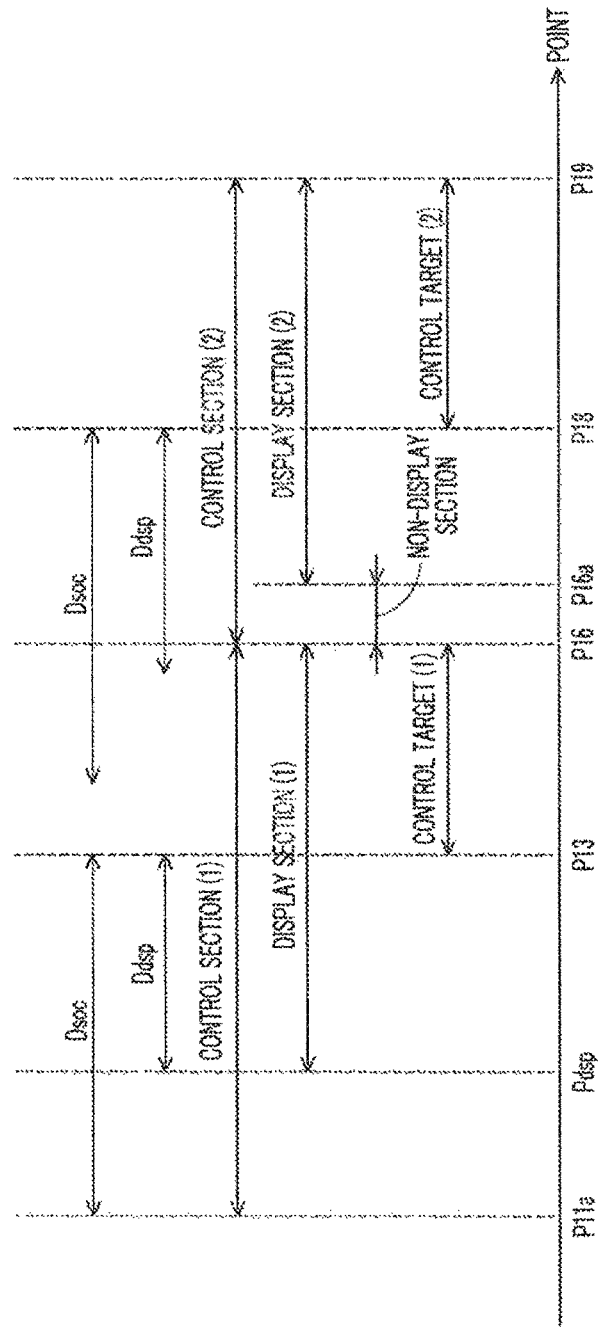
FIG. 16 is a diagram illustrating an SOC control display section in the HMI device when sequential SOC control is performed.

FIG. 16 is a diagram illustrating display sections of the SOC control on the HMI device 140 when sequential SOC control is performed. Referring to FIG. 16, the horizontal axis represents points in a scheduled traveling route of the vehicle 1. Sections from point P13 to point P16 are a control target of the SOC control (for example, a target congested section of the congestion SOC control) (hereinafter referred to as "control target (1)").

Control section (1) from point P11a to point P16 is a section in which the SOC control is being performed on control target (1). Display section (1) from point Pdsp to point P16 is a section in which that the SOC control for control target (1) is performed is displayed on the HMI device 140.

The section from point P18 to point P19 is also a control target of the SOC control (hereinafter referred to as "control target (2)"). Control target (2) may be of the same type (target congested section, target downhill section, or target uphill section) as control target (1) or may be of different types therefrom.

In the example illustrated in FIG. 16, a gap between control target (1) and control target (2) is small, and a distance from an end point P16 of control target (1) to a start point P18 of control target (2) is smaller than the distances Dsoc and Ddsp for defining the execution start time and the display start time of the SOC control for control target (2). Accordingly, when the SOC control for control target (1) ends at the end point P16 of control target (1), the SOC control for control target (2) is immediately performed (control section (2)).

At a time point at which the vehicle 1 passes through the end point P16 of control target (1), the distance from the vehicle 1 to the start point P18 of control target (2) is less than the predetermined distance Ddsp for control target (2). At this time, when display of the SOC control in execution for control target (2) is started, this display is continuous from the display for control target (1) and thus a driver may feel discomfort due to maintenance of display of the SOC control in execution in spite of passing through control target (1).

In the vehicle 1 according to the second embodiment, until a predetermined time elapses after the SOC control for control target (1) ends, that the SOC control is being performed is not displayed on the HMI device 140. In FIG. 16, for a predetermined time from the end point P16 of control target 91) to point P16a, a section in which icon 142 and icon 144 (see FIG. 8) are not displayed on the HMI device 140 is provided. Accordingly, a driver can be aware that the SOC control for control target (1) has ended normally.

Figure 17:
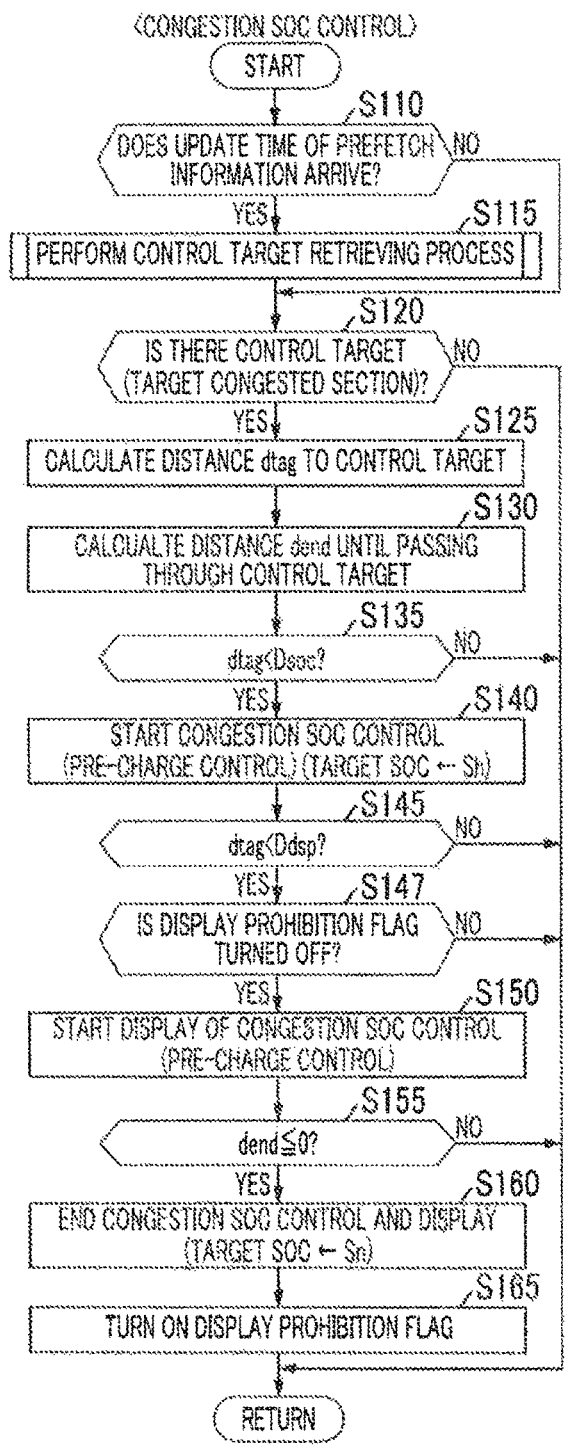
FIG. 17 is a flowchart illustrating a process flow of congestion SOC control which is performed by an HV-ECU according to a second embodiment.

FIG. 17 is a flowchart illustrating a process flow of the congestion SOC control which is performed by the HV-ECU 100 according to the second embodiment. Referring to FIG. 17, the flowchart is different from the flowchart illustrating the process flow of the congestion SOC control according to the first embodiment illustrated in FIG. 10, except that Step S147 and Step S165 are added thereto.

That is, when it is determined in Step S145 that the distance dtag is less than the predetermined distance Ddsp (YES in Step S145), the HV-ECU 100 determines whether a display prohibition flag is in an OFF state (Step S147). The display prohibition flag is a flag for prohibiting it from being displayed on the HMI device 140 that the SOC control is being performed, and when the display prohibition flag is in an ON state, the display is prohibited.

When it is determined in Step S147 that the display prohibition flag is in the OFF state (YES in Step S147), the HV-ECU 100 performs the process of Step S150 to start displaying that the congestion SOC control (pre-charge control) is being performed on the HMI device 140.

On the other hand, when it is determined in Step S147 that the display prohibition flag is in the ON state (NO in Step S147), the HV-ECU 100 restarts the process flow without performing the subsequent processes. In this case, displaying that the congestion SOC control (pre-charge control) is performed is not started, that is, displaying that the congestion SOC control (pre-charge control) is performed on the HMI device 140 is prohibited.

When the congestion SOC control (pre-charge control) ends in Step S160 and display on the HMI device 140 also ends, the HV-ECU 100 switches the display prohibition flag to the ON state (Step S165). Accordingly, displaying that the SOC control is being performed on the HMI device 140 is prohibited after passing through the control target (the target congested section).

When the display prohibition flag is switched to the ON state in Step S165, the HV-ECU 100 switches the display prohibition flag to the OFF state after a predetermined time elapses therefrom.

Figure 18:
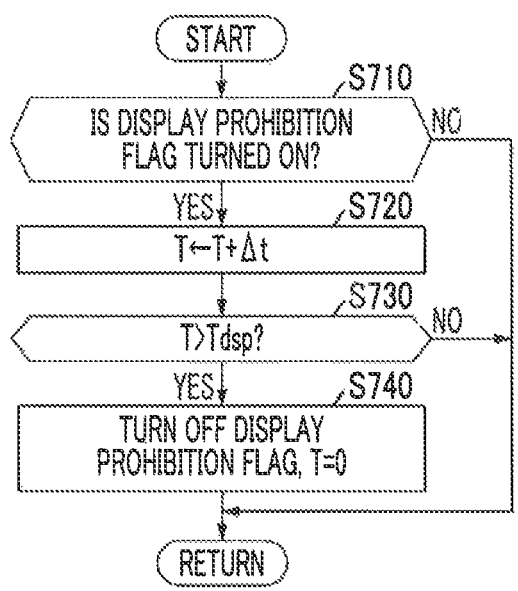
FIG. 18 is a flowchart illustrating a process flow of turning off a display prohibition flag which is performed by the HV-ECU.

FIG. 18 is a flowchart illustrating a process flow of turning off the display prohibition flag by the HV-ECU 100. A series of processes illustrated in the flowchart is repeatedly performed at predetermined time intervals Δt.

Referring to FIG. 18, the HV-ECU 100 determines whether the display prohibition flag is in the ON state (Step S710). When the display prohibition flag is in the OFF state (NO in Step S710), the HV-ECU 100 restarts the process flow without performing the subsequent processes.

When it is determined in Step S710 that the display prohibition flag is in the ON state (YES in Step S710), the HV-ECU 100 adds a predetermined time Δt to a display prohibition time T (Step S720). Then, the HV-ECU 100 determines whether the display prohibition time T is longer than a threshold time Tdsp (Step S730). The threshold time Tdsp is a time in which displaying the SOC control on the HMI device 140 is prohibited after passing through a control target and is set to a time in which a driver can be aware of the end of the SOC control corresponding to passage through the control target.

When it is determined in Step S730 that the display prohibition time T is not longer than the threshold time Tdsp (NO in Step S730), the HV-ECU 100 restarts the process flow without performing the process of Step S740.

On the other hand, when it is determined in Step S730 that the display prohibition time T is longer than the threshold time Tdsp (YES in Step S730), the HV-ECU 100 switches the display prohibition flag to the OFF state and resets the display prohibition time T to 0 (Step S740).

Through the above-mentioned processes, the display prohibition flag which is switched to the ON state in Step S165 in FIG. 17 is switched to the OFF state after the threshold time Tdsp elapses.

Figure 19:
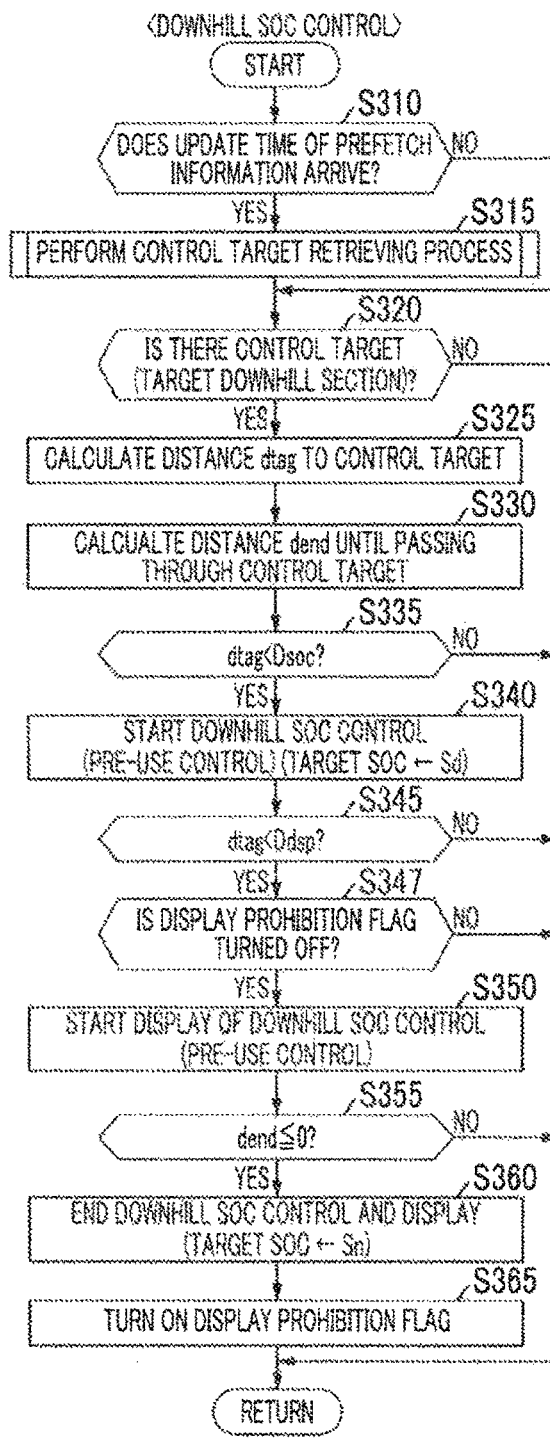
FIG. 19 is a flowchart illustrating a process flow of downhill SOC control which is performed by the HV-ECU according to the second embodiment.

FIG. 19 is a flowchart illustrating a process flow of the downhill SOC control which is performed by the HV-ECU 100 according to the second embodiment. Referring to FIG. 19, the flowchart is different from the flowchart illustrating the process flow of the downhill SOC control according to the first embodiment illustrated in FIG. 12, in that Step S347 and Step S365 are added thereto.

That is, when it is determined in Step S345 that the distance dtag is less than the predetermined distance Ddsp (YES in Step S345), the HV-ECU 100 determines whether the display prohibition flag is in the OFF state (Step S347). When it is determined in Step S347 that the display prohibition flag is in the OFF state (YES in Step S347), the HV-ECU 100 performs the process of Step S350 to start displaying that the downhill SOC control (pre-use control) is performed on the HMI device 140.

On the other hand, when it is determined in Step S347 that the display prohibition flag is in the ON state (NO in Step S347), the HV-ECU 100 restarts the process flow without performing the subsequent processes. In this case, displaying that the downhill SOC control (pre-use control) is performed is not started, that is, displaying that the downhill SOC control (pre-use control) is performed on the HMI device 140 is prohibited.

When the downhill SOC control (pre-use control) ends in Step S360 and display on the HMI device 140 also ends, the HV-ECU 100 switches the display prohibition flag to the ON state (Step S365). Accordingly, displaying that the SOC control is being performed on the HMI device 140 is prohibited after passing through the control target (the target downhill section).

When the display prohibition flag is switched to the ON state in Step S365, the HV-ECU 100 switches the display prohibition flag to the OFF state after the threshold time Tdsp elapses therefrom.

Figure 20:
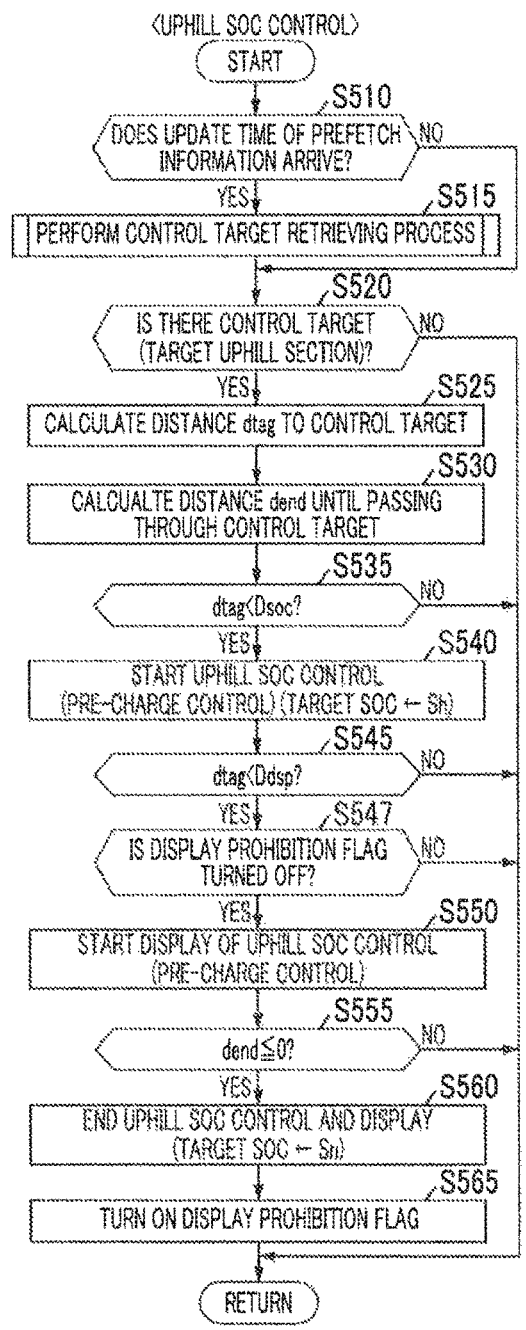
FIG. 20 is a flowchart illustrating a process flow of uphill SOC control which is performed by the HV-ECU according to the second embodiment.

FIG. 20 is a flowchart illustrating a process flow of the uphill SOC control which is performed by the HV-ECU 100 according to the second embodiment. Referring to FIG. 20, the flowchart is different from the flowchart illustrating the process flow of the uphill SOC control according to the first embodiment illustrated in FIG. 14, in that Step S547 and Step S565 are added thereto.

That is, when it is determined in Step S545 that the distance dtag is less than the predetermined distance Ddsp (YES in Step S545), the HV-ECU 100 determines whether the display prohibition flag is in the OFF state (Step S547). When it is determined in Step S547 that the display prohibition flag is in the OFF state (YES in Step S547), the HV-ECU 100 performs the process of Step S550 to start displaying that the uphill SOC control (pre-charge control) is performed on the HMI device 140.

On the other hand, when it is determined in Step S547 that the display prohibition flag is in the ON state (NO in Step S547), the HV-ECU 100 restarts the process flow without performing the subsequent processes. In this case, displaying that the uphill SOC control (pre-charge control) is performed is not started, that is, displaying that the uphill SOC control (pre-charge control) is performed on the HMI device 140 is prohibited.

When the uphill SOC control (pre-charge control) ends in Step S560 and display on the HMI device 140 also ends, the HV-ECU 100 switches the display prohibition flag to the ON state (Step S565). Accordingly, displaying that the SOC control is being performed on the HMI device 140 is prohibited after passing through the control target (the target uphill section).

When the display prohibition flag is switched to the ON state in Step S565, the HV-ECU 100 switches the display prohibition flag to the OFF state after the threshold time Tdsp elapses therefrom.

As described above, in the second embodiment, that the SOC control is being performed is not displayed on the HMI device 140 before a predetermined time (the threshold time Tdsp) elapses after the SOC control ends, and display is started after the predetermined time elapses thereafter. Accordingly, a driver can be aware that the SOC control has ended normally. Accordingly, according to the second embodiment, it is possible to decrease a driver's discomfort when sequential SOC control is performed.

Modified Example of Second Embodiment

In the second embodiment, that the SOC control is being performed is not displayed for a predetermined time, but a predetermined distance may be used instead of the predetermined time. That is, before the vehicle 1 travels a predetermined distance after the SOC control ends (after passing through the control target), it may not be displayed that the SOC control is being performed.

Figure 21:
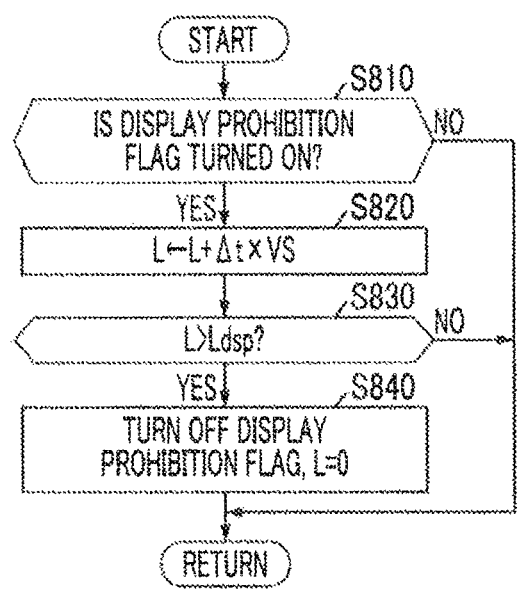
FIG. 21 is a flowchart illustrating a process flow of turning off a display prohibition flag which is performed by an HV-ECU according to a modified example of the second embodiment.

FIG. 21 is a flowchart illustrating a process flow of turning off the display prohibition flag which is performed by the HV-ECU 100. A series of processes illustrated in the flowchart is repeatedly performed at predetermined time intervals Δt.

Referring to FIG. 21, the HV-ECU 100 determines whether the display prohibition flag is in the ON state (Step S810). When the display prohibition flag is in the OFF state (NO in Step S810), the HV-ECU 100 restarts the process flow without performing the subsequent processes.

When it is determined in Step S810 that the display prohibition flag is in the ON state (YES in Step S810), the HV-ECU 100 adds a distance, which is obtained by multiplying the vehicle speed VS acquired from the vehicle speed sensor 124 (see FIG. 2) by a predetermined time Δt, to a display prohibition distance L (Step S820). The HV-ECU 100 may add a traveling distance, which is acquired by counting the number of pulses from the vehicle speed sensor 124 for the predetermined time Δt, to the display prohibition distance L. Then, the HV-ECU 100 determines whether the display prohibition distance L is greater than a threshold distance Ldsp (Step S830). The threshold distance Ldsp is a traveling distance in which displaying the SOC control on the HMI device 140 is prohibited after passing through a control target.

When it is determined in Step S830 that the display prohibition distance L is not greater than the threshold distance Ldsp (NO in Step S830), the HV-ECU 100 restarts the process flow without performing the process of Step S840.

On the other hand, when it is determined in Step S830 that the display 26 prohibition distance L is greater than the threshold distance Ldsp (YES in Step S830), the HV-ECU 100 switches the display prohibition flag to the OFF state and resets the display prohibition distance L to 0 (Step S840).

Through the above-mentioned processes, the display prohibition flag which is switched to the ON state in Step S165 in FIG. 17, step S365 in FIG. 19, and Step S565 in FIG. 20 is switched to the OFF state after the vehicle travels the threshold distance Ldsp.

In the first and second embodiments, a vehicle which is equipped with all the congestion SOC control, the downhill SOC control, and the uphill SOC control has been described, but a vehicle to which the invention can be applied is not limited to a vehicle equipped with all of the SOC controls as long as it is a vehicle equipped with at least one of the congestion SOC control, the downhill SOC control, and the uphill SOC control.

In the above description, the second MG 30 corresponds to one example of the "motor generator" in the claims, and the HV-ECU 100 corresponds to one example of the "electronic control unit" in the claims. The HMI device 140 corresponds to one example of the "display device" in the claims.

It should be understood that the above-disclosed embodiments are exemplary in all respects, but are not restrictive. The scope of the invention is defined by the appended claims, not by the above-mentioned embodiments, and includes all modifications within meanings and scopes equivalent to the claims.

What is claimed is:

1. An electric vehicle comprising:
a power storage device;
a motor generator configured to generate a driving force for traveling using electric power stored in the power storage device, the motor generator being configured to generate regenerative power;
an electronic control unit configured to
specify a control target section satisfying a predetermined condition in a scheduled traveling route, and
perform a charging state control to change a state of charge of the power storage device in advance before the electric vehicle enters the control target section; and
a display device configured to display that the charging state control is being performed,
wherein the electronic control unit is configured to control the display device
such that information that the charging state control is being performed is not displayed until a distance from the electric vehicle to a start point of the control target section is less than a predetermined distance after the charging state control is started, and
such that the information that the charging state control is being performed is displayed when the distance is less than the predetermined distance.

2. The electric vehicle according to claim 1, wherein the electronic control unit is configured to:
specify a congested section satisfying the predetermined condition in the scheduled traveling route as the control target section using congestion information that is updated at predetermined time intervals;
start the charging state control such that the state of charge of the power storage device increases before the electric vehicle enters the congested section; and
control the display device such that the information that the charging state control is being performed is not displayed until a distance from the electric vehicle to a start point of the congested section is less than the predetermined distance after the charging state control is started.

3. The electric vehicle according to claim 1, wherein the electronic control unit is configured to:
specify a downhill section satisfying the predetermined condition in the scheduled traveling route as the control target section using map information including information on road gradients;
start the charging state control such that the state of charge of the power storage device decreases before the electric vehicle enters the downhill section; and
control the display device such that the information that the charging state control is being performed is not displayed until a distance from the electric vehicle to a start point of the downhill section is less than the predetermined distance after the charging state control is started.

4. The electric vehicle according to claim 1, wherein the electronic control unit is configured to:
specify an uphill section satisfying the predetermined condition in the scheduled traveling route as the control target section using map information including information on road gradients;
start the charging state control such that the state of charge of the power storage device increases before the electric vehicle enters the uphill section; and
control the display device such that the information that the charging state control is being performed is not displayed until a distance from the electric vehicle to a start point of the uphill section is less than the predetermined distance after the charging state control is started.

5. The electric vehicle according to claim 1, wherein the electronic control unit is configured to:
control the display device such that the information that the charging state control is being performed is not displayed until a predetermined period elapses after the charging state control ends; and
control the display device such that information regarding the charging state control is displayed after the predetermined period elapses.

6. A control method for an electric vehicle, the electric vehicle including
a power storage device,
a motor generator configured to generate a driving force for traveling using electric power stored in the power storage device, the motor generator being configured to generate regenerative power,
and
an electronic control unit,
the control method comprising:
specifying, by the electronic control unit, a control target section satisfying a predetermined condition in a scheduled traveling route; and
performing, by the electronic control unit, charging state control to change a state of charge of the power storage device in advance before the electric vehicle enters the control target section,
the electric vehicle further including a display device configured to display that the charging state control is being performed,
the control method further comprising controlling the display device by the electronic control unit
such that information that the charging state control is being performed is not displayed until a distance from the electric vehicle to a start point of the control target section is less than a predetermined distance after the charging state control is started, and such that the information that the charging state control is being performed is displayed when the distance is less than the predetermined distance.

* * * * *